(12) United States Patent
Hagen et al.

(10) Patent No.: US 12,260,446 B2
(45) Date of Patent: Mar. 25, 2025

(54) SHOPPING CART WITH INFRARED PRODUCT VALIDATION

(71) Applicant: Target Brands, Inc., Minneapolis, MN (US)

(72) Inventors: Todd A. Hagen, Minneapolis, MN (US); Andrew Wipf, Minneapolis, MN (US); Donnie Tolbert, Minneapolis, MN (US); Arne Wilkin, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 380 days.

(21) Appl. No.: 17/960,280

(22) Filed: Oct. 5, 2022

(65) Prior Publication Data
US 2023/0143479 A1    May 11, 2023

Related U.S. Application Data

(60) Provisional application No. 63/340,698, filed on May 11, 2022, provisional application No. 63/276,386, filed on Nov. 5, 2021.

(51) Int. Cl.
| | |
|---|---|
| *G06Q 30/0601* | (2023.01) |
| *B62B 5/00* | (2006.01) |
| *G01V 8/20* | (2006.01) |
| *G06F 18/22* | (2023.01) |
| *G06F 18/24* | (2023.01) |

(Continued)

(52) U.S. Cl.
CPC .......... *G06Q 30/0633* (2013.01); *G01V 8/20* (2013.01); *G06F 18/22* (2023.01); *G06F 18/24* (2023.01); *G06T 7/11* (2017.01); *G06T 7/50* (2017.01); *G06T 17/10* (2013.01); *B62B 5/0096* (2013.01); *G06T 2207/30196* (2013.01)

(58) Field of Classification Search
CPC .......... G01V 8/20; G06F 18/22; G06F 18/24; G06Q 30/0633; G06Q 30/0635; G06T 7/11; G06T 7/50; G06T 17/00; G06T 17/10; G06T 2207/30196; B62B 5/0096
See application file for complete search history.

(56) References Cited

U.S. PATENT DOCUMENTS

| | | | |
|---|---|---|---|
| 4,071,740 A | 1/1978 | Gogulski | |
| 8,547,374 B1 * | 10/2013 | Sadjadi | .................. G06T 7/593 |
| | | | 382/103 |

(Continued)

*Primary Examiner* — Katrina R Fujita
(74) *Attorney, Agent, or Firm* — Barnes & Thornburg LLP

(57) ABSTRACT

The disclosed technology provides for reconstructing products that are added to a shopping cart in three-dimensional space. The reconstructed products can be used for product validation. A shopping cart can include product validation hardware including light emitters and light sensors along a top perimeter of the shopping cart. The shopping cart can activate the light emitters to emit light across a top horizontal plane of the shopping cart, receive, from light sensors on a side of the shopping cart opposite a side where the activated light emitter is located, light intensity data as a product passes through the top horizontal plane and obstructs at least a portion of the emitted light from being detected by the light sensors, identify, from the light intensity data, slices of the product, and reconstruct the product in 3D space based on stitching together the slices.

20 Claims, 12 Drawing Sheets

(51) Int. Cl.
    *G06T 7/11*         (2017.01)
    *G06T 7/50*         (2017.01)
    *G06T 17/10*      (2006.01)

(56) References Cited

U.S. PATENT DOCUMENTS

| | | |
|---|---|---|
| 8,678,281 B2 | 3/2014 | Kangas et al. |
| 10,229,406 B2 | 3/2019 | Vasgaard et al. |
| 10,308,269 B2 | 6/2019 | Bacallao et al. |
| 10,600,043 B2 | 3/2020 | Chaubard et al. |
| 10,769,713 B1 | 9/2020 | Townsend |
| 10,810,715 B2 | 10/2020 | Chamberlin |
| 10,949,804 B2 | 3/2021 | Gopalakrishnan et al. |
| 11,636,457 B1* | 4/2023 | De Bonet ............ G06Q 20/204 |
| | | 705/23 |
| 2007/0143188 A1 | 6/2007 | Kelley et al. |
| 2012/0284132 A1* | 11/2012 | Kim ...................... G06Q 20/18 |
| | | 235/375 |
| 2018/0189763 A1* | 7/2018 | Olmstead ............... G06V 10/42 |
| 2018/0197218 A1* | 7/2018 | Mallesan ............... G07G 1/0054 |
| 2019/0108396 A1* | 4/2019 | Dal Mutto ............. G06V 20/52 |
| 2020/0228753 A1* | 7/2020 | Ortiz Egea ............. H04N 5/33 |
| 2020/0275059 A1* | 8/2020 | De Bonet ............. G06V 10/141 |
| 2021/0117950 A1* | 4/2021 | Bentsur ................. G01G 19/08 |
| 2021/0366101 A1* | 11/2021 | George Boehm, Jr. ..................... |
| | | G06T 7/0004 |
| 2022/0005327 A1* | 1/2022 | Cleper ................. G07G 1/0081 |
| 2022/0019988 A1* | 1/2022 | Chilukuri ............... H04N 23/61 |
| 2022/0198550 A1* | 6/2022 | Meidar ................. G06Q 20/20 |
| 2023/0087587 A1* | 3/2023 | Yang .................... G06Q 20/208 |
| | | 705/23 |
| 2023/0252750 A1* | 8/2023 | Bjelcevic ............... G06V 10/12 |

\* cited by examiner

SHOPPING CART WITH INFRARED PRODUCT VALIDATION

CROSS-REFERENCE TO RELATED APPLICATIONS

This application claims priority to U.S. Provisional Application Ser. No. 63/340,698, filed on May 11, 2022 and U.S. Provisional Application Ser. No. 63/276,386, filed on Nov. 5, 2021, the disclosures of which are incorporated by reference in their entirety.

TECHNICAL FIELD

This document generally describes devices, systems, and methods related to validating aspects of items as they are added to or removed from a shopping cart.

BACKGROUND

Guests (e.g., customers or other relevant users) can go to retail environments, such as stores, to purchase one or more products. A guest can load a shopping cart with the one or more products they wish to purchase. When they are done collecting those products, the guest can go to a checkout lane in order to complete the transaction process and leave the retail environment.

Retail checkout may occur at checkout lanes where a retail employee scans product identifiers for every product the guest wants to purchase. Retail checkout may also occur at self-checkout lanes/stations where the guest, instead of the retail employee, scans product identifiers for every product the guest wants to purchase. The retail employee's role can change such that the retail employee may divide their attention across overseeing (e.g., reviewing) multiple self-checkout lanes/stations in the retail environment. Sometimes, the retail employee may not notice a guest intentionally or unintentionally leaving the retail environment with a product that they did not scan at the self-checkout lanes, especially since the retail employee's attention is divided over multiple self-checkout lanes.

Some retail environments have permitted guests to use scan and go technology to complete retail checkout in the retail environment instead of at a checkout lane or self-checkout lane. Scan and go technology can move the product scanning process further away from review of retail employee(s). Some scan and go systems have used employees to manually check and verify that the guest is leaving the store with only those items scanned and purchased on their mobile device before exiting the retail environment.

SUMMARY

The document generally relates to technology for automatically validating aspects of products (e.g., items) that are added to or removed from a shopping cart in a retail environment (e.g., a store). For example, the disclosed technology can include infrared (IR) emitters and receivers (and/or other non-visible light emitters and receivers) that are positioned at or around the opening of a shopping cart. The IR emitters can be selectively activated as items are placed into or removed out of the shopping cart, which can cause IR receivers on opposing sides of the shopping cart opening to collectively detect IR signals that indicate to the physical contours of the item. Selective activation of IR emitters around the perimeter can provide sufficient data that can be used to construct a 3D representation of the item (e.g., dimensions), which can be used to determine whether the item added to the shopping cart corresponds a product that is expected to be placed in the cart, such as a product that was recently scanned on a mobile device. If the determined 3D representation from the IR emitters and receivers matches or otherwise corresponds to an expected product (i.e., scanned product), then the physical product placed in the cart can be validated as the expected product. However, if the 3D representation does not match or otherwise correspond to the expected product, then the physical product placed in the cart is not validated, which can result in one or more subsequent actions (e.g., request for rescan of product, request for checkout at point of sale terminal).

The disclosed technology can be used in combination with and to improve mobile device-based scanning of items and checkout processes, such as scan and go checkout systems. For example, existing scan and go technology presents a variety of problems, including guests potentially placing taking a different item than the item scanned and misidentifying the quantity of products scanned versus taken, both of which can result in shortages for the retailer. Additionally, manual checks to ward against shortages with scan and go checkouts can present a variety of drawbacks, such as slowing down the checkout/departure process (mitigating some of the benefits of using scan and go technology), increasing labor costs for dedicated manually checkers, and potentially failing to remedy these issues due to potential human error during the checking process. The disclosed technology can resolve these and/or other problems with scan and go type systems. For example, the disclosed technology can provide for more accurate, granular, and efficient validation of scanned items as shopping progresses—meaning verifying that the physical item added to a shopping cart is the item that was scanned (and in the same quantity as recorded as part of the scan). This can provide a variety of benefits, such as reducing shortages and other inconsistencies between the physical goods that a guest leaves with and those that the guest pays for during the checkout process. For example, a guest may only be presented with an option to checkout on their mobile device if each scanned item has been validated by the shopping cart, and may otherwise be directed to physical checkout lanes if there are inconstancies between the scanned items and the physical items in the cart. This can permit for guests with fully validated carts to more quickly and readily checkout, can reduce the manual effort to manage such checkout processes for retailers, and can provide for greater levels of trust between retailers and guests using scan and go type systems, which can increase the prevalence and availability of such systems for guests across retail environments.

The disclosed technology can provide for detecting, tracking, and validating products as they are placed in the shopping cart using, for example, low cost IR components. For example, IR emitters and receivers can be used to obtain 2D representations of physical products as they pass through a top horizontal plane of the shopping cart. These 2D representations (slides) can be combined to generate a 3D representation of the product. As a result, high accuracy photogrammetry can be used to detect the 3D shape of a product, which can permit for more accurate product classification and quantity estimation. The disclosed technology can facilitate quick, low cost, and accurate completion of retail checkout processes in a low surveillance retail environment.

As part of the disclosed technology, a shopping cart (e.g., smart cart) in a retail environment can, for example, include alternating IR emitters and sensors along a top horizontal plane of the cart. When a guest scans a product with their mobile device, the disclosed techniques can be triggered. The IR emitters (e.g., lights) can be activated one at a time to illuminate a side of the cart as the IR sensors (e.g., IR optical flow sensors) on the opposite side of the cart detect occlusions across the top horizontal plane as the scanned product is being put into the cart. Thus, a single IR emitter can be activated at a time and a next IR emitter can be activated in a clockwise direction around the perimeter of the shopping cart to build a shadow map of the product from every angle as the product moves through the top horizontal plane of the cart. The shadow map can be generated as part of an IR sweep. Slices of the product can be captured over time then joined together into a 3D representation (e.g., model) of the product. Noise can be filtered out and guest hands can be semantically separated from the product. Expected shape and volume data for the product can be retrieved from a data store using product identification information that was identified by the guest's initial scan of the product. The expected shape and volume data can then be used to determine whether the product's geometry is sufficiently close to that of the expected product (e.g., the product that is identified by the guest scan).

If a product match is identified, then the guest placed a product in the cart that matches the product that the guest initially scanned. It can also be determined that the transaction reflects the correct classification for the product, the correct quantity of the product added to the cart, and the correct directionality of the product (e.g., the product is added to the cart, not taken out of the cart). Since this information can be validated in real-time at the cart and while the guest is shopping or otherwise moving around the store, the guest can complete their transaction at their mobile device without having to go through the retail checkout process at a checkout lane or self-checkout station (e.g., lane). As a result, the guest can walk out of the retail environment with the products in the cart and the transaction completed, which can improve the guest's overall shopping experience at the retail environment.

If, on the other hand, a product match is not identified, then the guest scanned a different product than what the guest placed in the cart. The guest may be engaging in suspicious activity or otherwise trying to purchase a product for the price of a different product (e.g., ticket switching). It can also be determined that the guest did not scan a correct product or a correct quantity of the product and/or the product directionality is inaccurate (e.g., the guest removed the product from the cart but the product was added to the guest's transaction because the guest scanned the product with their mobile device). If the product match is not identified for any of the reasons mentioned above, the guest can be notified to put the correct product in their cart. In-store employees can also, in some implementations, be notified of the product mismatch.

In some implementations, an alternate verification technique can be performed for products that do not have a definitive physical shape, such as clothes or other soft, unstructured goods, but have RFID tags. Instead of performing an IR sweep of such a product, the disclosed techniques can provide for detecting the RFID tag for the product as it is placed in the shopping cart and determining whether the RFID tag matches an RFID tag for an expected product.

One or more embodiments described herein can include a system for validating products that are added to a shopping cart, the system including: a shopping cart that can retain one or more products and be pushed by a user in a retail environment. The shopping cart can include product validation hardware and a controller, the product validation hardware including a group of alternating light emitters and light sensors positioned in a straight line along a top perimeter of the shopping cart that corresponds to a top horizontal plane of the shopping cart. The shopping cart can be configured to: activate each of the light emitters in a successive order to emit light across the top horizontal plane of the shopping cart, receive, from one or more of the light sensors that are positioned on a side of the shopping cart that is opposite a side of the shopping cart where the activated light emitter is located, light intensity data that is collected by the one or more light sensors as a product passes through the top horizontal plane of the shopping cart and obstructs at least a portion of the emitted light from being detected by the one or more light sensors, identify, from the received light intensity data, one or more slices of the product, and reconstruct the product in three-dimensional (3D) space based on stitching together the identified slices of the product. The reconstructed product can be used to validate the product that is added to the shopping cart.

In some implementations, the embodiments described herein can optionally include one or more of the following features. For example, the product validation hardware further can include one or more optical flow sensors positioned along the top perimeter of the shopping cart. The shopping cart can be configured to: receive, from one or more of the optical flow sensors, position translation data of the product as the product passes through the top horizontal plane of the shopping cart, determine, based on the position translation data, a velocity of the product, and identify, based on the velocity of the product, the one or more slices of the product.

As another example, the system can also include a mobile device in communication with at least one of the product validation hardware and the controller of the shopping cart. The mobile device can be configured to: receive user input indicating a scan of the product to be added to the shopping cart, identify a unique identifier for the product based on the scan, and retrieve, from a data store and based on the unique identifier, product information for the scanned product. The mobile device can also: receive the reconstructed product from the shopping cart, compare the reconstructed product to product information of the scanned product to determine whether the reconstructed product is within a predetermined threshold range of the product information, and generate, based on determining that the reconstructed product is within the predetermined threshold range of the product information, output indicating that the product added to the shopping cart is validated. In some implementations, the mobile device can transmit the product information of the scanned product to the shopping cart, receive the reconstructed product from the shopping cart, and the shopping cart can: compare the reconstructed product to product information to determine whether the reconstructed product is within a predetermined threshold range of the product information, and generate, based on determining that the reconstructed product is within the predetermined threshold range of the product information, output indicating that the product added to the shopping cart is validated.

In some implementations, the shopping cart can receive, from one or more of the light sensors, an indication that the product is entering the top horizontal plane of the shopping cart. The indication can be a detection, by one or more of the light sensors, of a light beam being broken at the top horizontal plane of the shopping cart. In some implementations, the light emitters can be infrared (IR) emitters and the light sensors can be IR sensors. As another example, the light emitters can be activated one at a time in a clockwise direction around a perimeter of the shopping cart. Sometimes, the slices of the product can be occlusion slices representing low intensity light signals in the light intensity data of the product as the product changes in position over time. As another example, reconstructing the product in three-dimensional (3D) space can include: normalizing an orientation of the reconstructed product in a standard coordinate plane, constraining the reconstructed product to a shape in a predefined set of primitive shapes to filter out noise, the predefined set of primitive shapes including at least one of rectangles, boxes, cylinders, and spheres, and detecting body parts of a user in the reconstructed product and semantically separating the detected body parts from the reconstructed product.

One or more embodiments described herein can include a system for validating products that are added to a shopping cart, the system including: a shopping cart that can retain one or more products and be pushed by a user in a retail environment. The shopping cart can include product validation hardware and a controller, the product validation hardware including a group of alternating light emitters and light sensors positioned in a straight line along a top perimeter of the shopping cart that corresponds to a top horizontal plane of the shopping cart and one or more optical flow sensors positioned along the top perimeter of the shopping cart. The system can also include a mobile device in communication with at least one of the product validation hardware and the controller of the shopping cart. The mobile device can be configured to: receive user input indicating a scan of a product to be added to the shopping cart, identify a unique identifier for the product based on the scan, retrieve, from a data store and based on the unique identifier, product information for the scanned product, and transmit, to the controller, the product information. The controller of the shopping cart can be further configured to: receive, from the mobile device, the product information, receive, from one or more of the light sensors, an indication that the product is entering a top horizontal plane of the shopping cart, activate, based on the indication, each of the light emitters in a successive order and at predetermined time intervals to emit light across the top horizontal plane of the shopping cart, receive, from one or more of the light sensors that are positioned on a side of the shopping cart that is opposite a side of the shopping cart where the activated light emitter is located, light intensity data that is collected by the one or more light sensors as the product passes through the top horizontal plane of the shopping cart and obstructs at least a portion of the emitted light from being detected by the one or more light sensors, receive, from one or more of the optical flow sensors, position translation data of the product as the product passes through the top horizontal plane of the shopping cart, determine, based on the position translation data, a velocity of the product, identify, from the received light intensity data and based on the velocity of the product, one or more slices of the product, reconstruct the product in three-dimensional (3D) space based on stitching together the identified slices of the product, compare the reconstructed product to the product information of the scanned product to determine whether the reconstructed product is within a predetermined threshold range of the product information, and generate, based on determining that the reconstructed product is within the predetermined threshold range of the product information, output indicating that the product added to the shopping cart is validated.

In some implementations, the system can optionally include one or more of the following features. For example, the indication that the product is entering the top horizontal plane of the shopping cart can be a detection, by one or more of the light sensors, of a light beam being broken at the top horizontal plane of the shopping cart. The light emitters can be infrared (IR) emitters and the light sensors can be IR sensors. The light emitters can be activated one at a time in a clockwise direction around a perimeter of the shopping cart. The position translation data can be received at a same time as the light intensity data. The light intensity data can be received, for each light emitter that is activated, within a period of time between deactivating the light emitter and activating a second, successive light emitter. In some implementations, the controller can also poll the one or more optical flow sensors for the position translation data at predetermined time intervals that are coordinated with the predetermined time intervals for activating each of the light emitters.

As another example, the slices of the product can be occlusion slices representing low intensity light signals in the light intensity data of the product as the product changes in position over time. Each of the light emitters can be individually activated until all of the light emitters have been activated. Each of the light emitters can be individually activated until one or more of the light sensors no longer detect that a light beam is broken at the top horizontal plane of the shopping cart. In some implementations, the position translation data can include movement direction and rate of movement of the product as it passes through the top horizontal plane of the shopping cart.

As another example, the controller can determine a directionality of the product based at least in part on the velocity of the product. The controller can also determine that the reconstructed product is within a predetermined threshold range of the product information comprises based on a geometry of the reconstructed product being within a predetermined threshold range of expected shape and volume data in the product information. Sometimes, the controller can determine that a classification of the product is correct based on the reconstructed product being within the predetermined threshold range of the product information. The controller can also determine a quantity of the product based on comparing the reconstructed product to expected shape and volume data in the product information.

In some implementations, reconstructing the product in three-dimensional (3D) space can include normalizing an orientation of the reconstructed product in a standard coordinate plane. Reconstructing the product in three-dimensional (3D) space can also include constraining the reconstructed product to a shape in a predefined set of primitive shapes to filter out noise, the predefined set of primitive shapes including at least one of rectangles, boxes, cylinders, and spheres. Sometimes, reconstructing the product in three-dimensional (3D) space further can include detecting body parts of a user in the reconstructed product and semantically separating the detected body parts from the reconstructed product. In some implementations, reconstructing the product in three-dimensional (3D) space can include applying a machine learning model to the slices of the product to generate the reconstructed product. The machine learning model could have been trained using a training dataset of (i) slices of other products and (ii) 3D reconstructions of the other products, in which (i)-(ii) could have been provided to the machine learning model as input to train and validate the machine learning model.

As another example, the mobile device can also receive the output indicating that the product added to the shopping cart is validated, and receive user input indicating a scan of another product that is to be added to the shopping cart. The mobile device can receive the output indicating that the product added to the shopping cart is validated, and complete a checkout process at the mobile device. In some implementations, the controller can generate, based on determining that the reconstructed product is not within the predetermined threshold range of the product information, output indicating that the product added to the shopping cart is not validated. The output can include a notification to be presented to the user at the mobile device, the notification prompting the user to (i) rescan the product that was added to the shopping cart or (ii) put a correct product that corresponds to the scanned product in the shopping cart. The controller can also generate, based on determining that the reconstructed product is not within the predetermined threshold range of the product information, instructions that, when executed at the mobile device, prevent the user from continuing to scan products with the mobile device until the product that was added to the shopping cart is validated. The output can include a notification to be transmitted to a computing device of a retail environment employee for presentation to the retail environment employee, the notification indicating that the user is engaging in suspicious activity. In some implementations, the controller can also store, in the data store, at least one of the light intensity data, the position translation data, the velocity, the slices of the product, the reconstructed product, and the generated output.

The devices, system, and techniques described herein may provide one or more of the following advantages. For example, the disclosed techniques can provide for verifying products added to a shopping cart so that the guest can walk out of the store without waiting in line at a checkout lane to complete the transaction. Thus, a guest can quickly and efficiently complete a shopping experience in the retail environment. Since products can be validated in real-time as they are added to the cart, the guest can simply finish putting products in their cart and leave the retail environment. The transaction can be completed in real-time at the guest's mobile device instead of at a checkout lane since the disclosed techniques can provide for ensuring product class and quantity correctness for the purpose of accurately charging the guest for the products placed in the cart and purchased. The disclosed techniques can also provide for ensuring deduction of a correct product class and quantity from inventory tracking systems in order to automatically, and in real-time, trigger replenishment and/or reorder workflows in the retail environment.

As another example, the disclosed techniques can be used for identifying product shortages in the retail environment and quickly addressing those shortages. For example, the disclosed techniques can provide for determining if and when a guest places a product in the cart that does not match a product scanned by the guest's mobile device. Such determinations can be flagged as potential suspicious activity, such as ticket switching. The guest can be notified to place the correct product in their cart. Retail environment employees (e.g., in-store employees) may also be notified about the potential suspicious activity. The employees can monitor the guest and/or approach the guest before they leave the retail environment to verify the products that the guest is purchasing. Thus, the retail environment employees and other relevant stakeholders/users can become aware of product shortages and can take steps to address those shortages.

The disclosed techniques also can provide for validating class correctness, quantity correctness, and product directionality for products placed in the cart. The IR sweeping process can be used to differentiate classes of products (e.g., Mac n Cheese box instead of a gallon of milk), a quantity of the product that is being put in the cart (e.g., 2 boxes of Mac n Cheese, not 1 gallon of milk), and whether the product is being added to or removed from the cart. As a result, the disclosed techniques can be used to dynamically validate and, in some implementations, update the guest's transaction to improve a shopping experience of the guest. For example, as mentioned above, this validation process can allow the guest to simply walk out of the retail environment with the products in the cart instead of having to wait in line and go through a checkout process at a checkout lane to complete the transaction.

As another example, the disclosed techniques can provide for building 3D models of products that are added to the cart with minimal visual sensing. As described herein, one IR emitter can be activated at a time to illuminate the product as it is added to the cart. The IR emitter can have low power consumption. The IR technology can also include low cost components that make the disclosed techniques economical at targeted quantities to deploy in shopping carts across many retail environments. Products can therefore be validated using low-processing slicing processes and IR sensor configuration integrated into the shopping cart to streamline a retail checkout process. The disclosed techniques can therefore reduce computational complexity, use of computational resources, and power consumption compared to approaches that leverage high resolution video and/or depth signals to perform 3D product modeling. Moreover, the low cost components can be easily replaced or otherwise repaired if the low cost components require any type of servicing.

Similarly, the disclosed techniques can leverage processing power of the cart controller and/or the guest's mobile device to validate products in real-time. The mobile device, for example, can utilize less computing resources than a central computing system for the retail environment or a network of retail environments and can have strong processing power. Processing at the mobile device can be efficient and avoid clogging network bandwidth. Reduction in sensor and compute requirements can also reduce power consumption. Reduced processing and power consumption can therefore result in quick validation determinations being made and an improved, expedited retail checkout process for the guest.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to detecting, tracking, and validating products as they are placed in a shopping cart to expedite a retail checkout process. Once a guest scans a product with their mobile device and begins placing the product in the guest's shopping cart (e.g., a smart cart), IR emitters along a top perimeter of the cart can be activated one at a time. Each of the IR emitters can cast light on the product as it passes through a top horizontal plane of the shopping cart. IR sensors on an opposite side of cart can detect shadows (e.g., light occlusions) formed by the product passing through the top horizontal plane of the cart as light is cast upon the product by the IR emitters. A shadow map can be generated and used to reconstruct the product in 3D space. Expected shape and volume data for the scanned product can be retrieved and the 3D reconstruction of the product can be compared to the retrieved data. As a result, it can be determined whether the product that was put in the cart matches the expected shape and volume data for the scanned product. Moreover, the disclosed techniques can be used to validity a classification of the product, a quantity of the product added to the cart, and/or a directionality of the product.

If there is a product match, the product that was put in the cart can be validated. The guest can continue scanning products and adding them to the cart. Eventually, the guest can leave the store without going through a retail checkout process at a checkout lane or self-checkout lane because the transaction can be validated and completed in real-time at the mobile device. If there is not a match, the guest can be notified to rescan the product or to put the correct product in the cart. After all, the guest might have scanned one product but placed another product in their cart. By leveraging computing and processing power of the guest's mobile device and low processing IR technology, the disclosed techniques can provide for validating products added to the guest's shopping cart, quickly completing a transaction without having to complete the transaction at a checkout lane, and identifying product shortages in the retail environment.

Figure 1A:
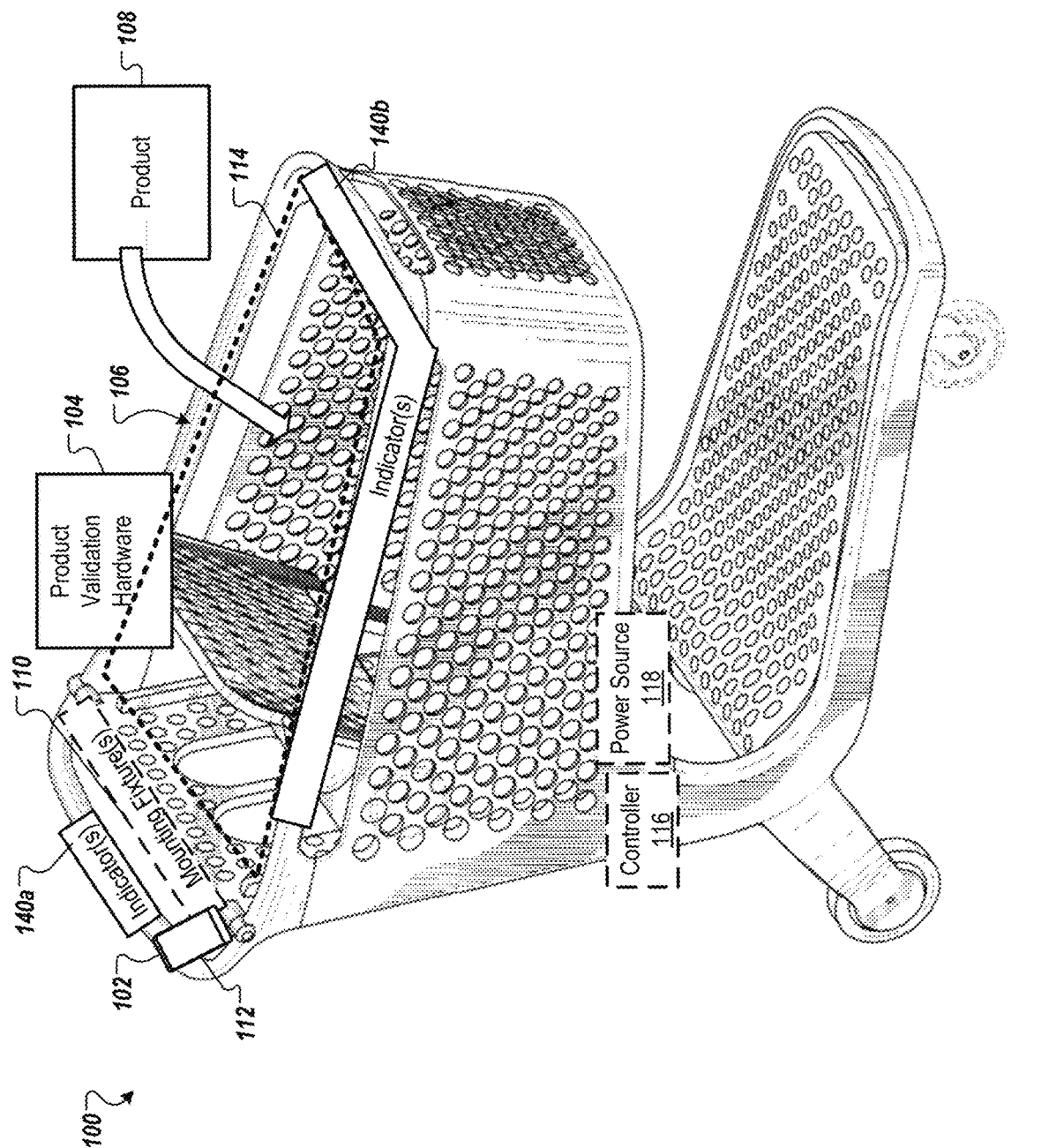
FIGS. 1A-B illustrate conceptual diagrams of a shopping cart that can implement IR validation techniques described herein to validate products as they are added to or removed from the shopping cart.
Figure 1B:
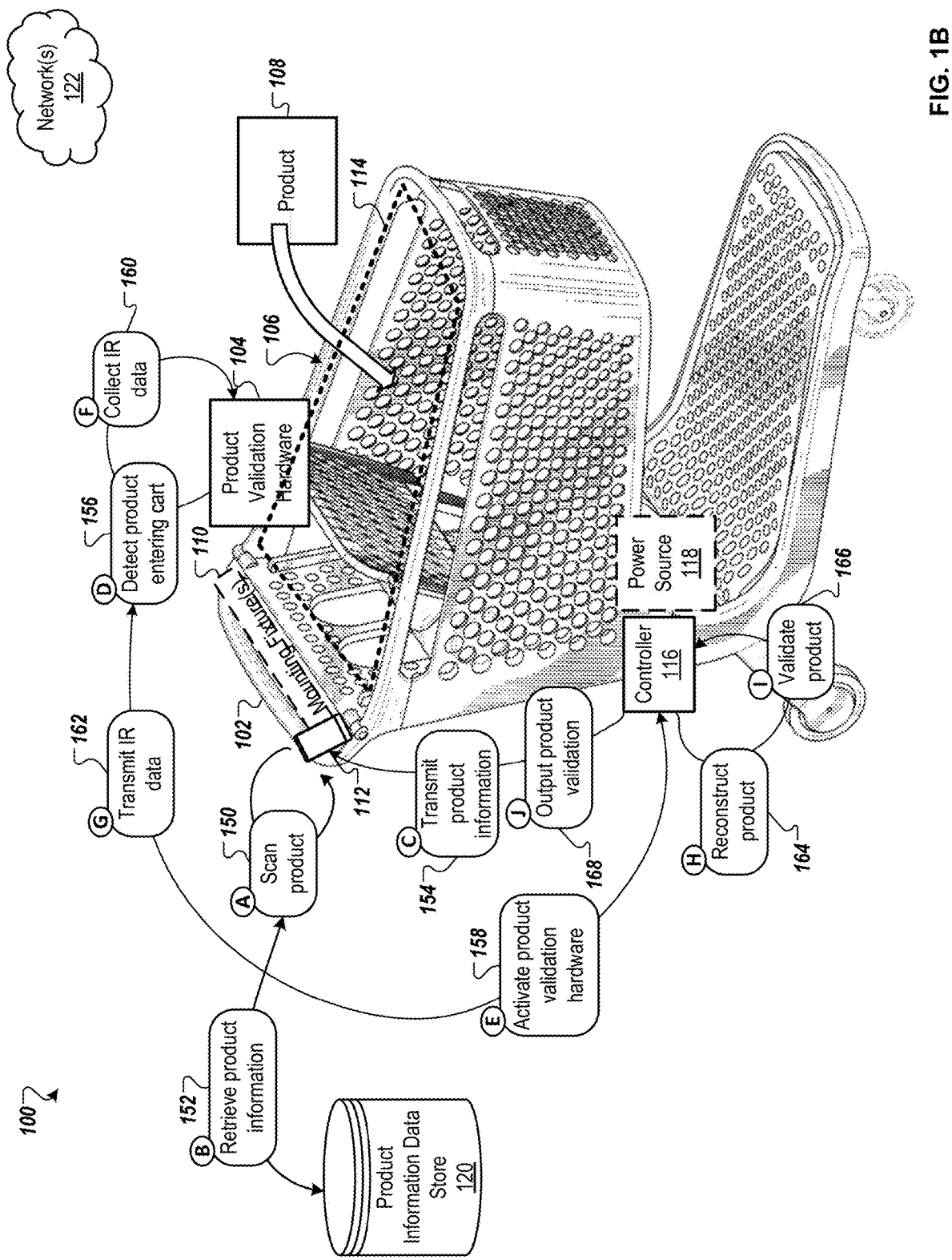

Referring to the figures, FIGS. 1A-B illustrate conceptual diagrams of a shopping cart 100 that can implement IR validation techniques described herein to validate products as they are added to or removed from the shopping cart. As shown in FIG. 1A, the shopping cart 100 can be a smart cart. In some implementations, the shopping cart 100 can be a preexisting shopping cart in the retail environment that has been modified/updated to include one or more components used for performing the IR validation techniques described herein. Since the components used for IR validation can be low cost, it can be easy and less expensive to modify existing shopping carts in the retail environment with the components.

The shopping cart 100 can include an optional mounting fixture(s) 110 near a handle 102 of the cart 100, product validation hardware 104, an optional controller 116, an optional power source 118, and indicators 140A-B. The mounting fixture(s) 110 can have a housing or other configuration that can removably receive a mobile device 112 (e.g., smart phone, mobile phone, cellphone, tablet, etc.) of a user. The housing or other configuration can be sized to fit mobile devices of varying sizes. The mounting fixture(s) 110 can also be located at one or more other regions of the shopping cart 100 to facilitate ease of access, attachment, and removal of the mobile device 112 from the shopping cart 100.

Figure 2:
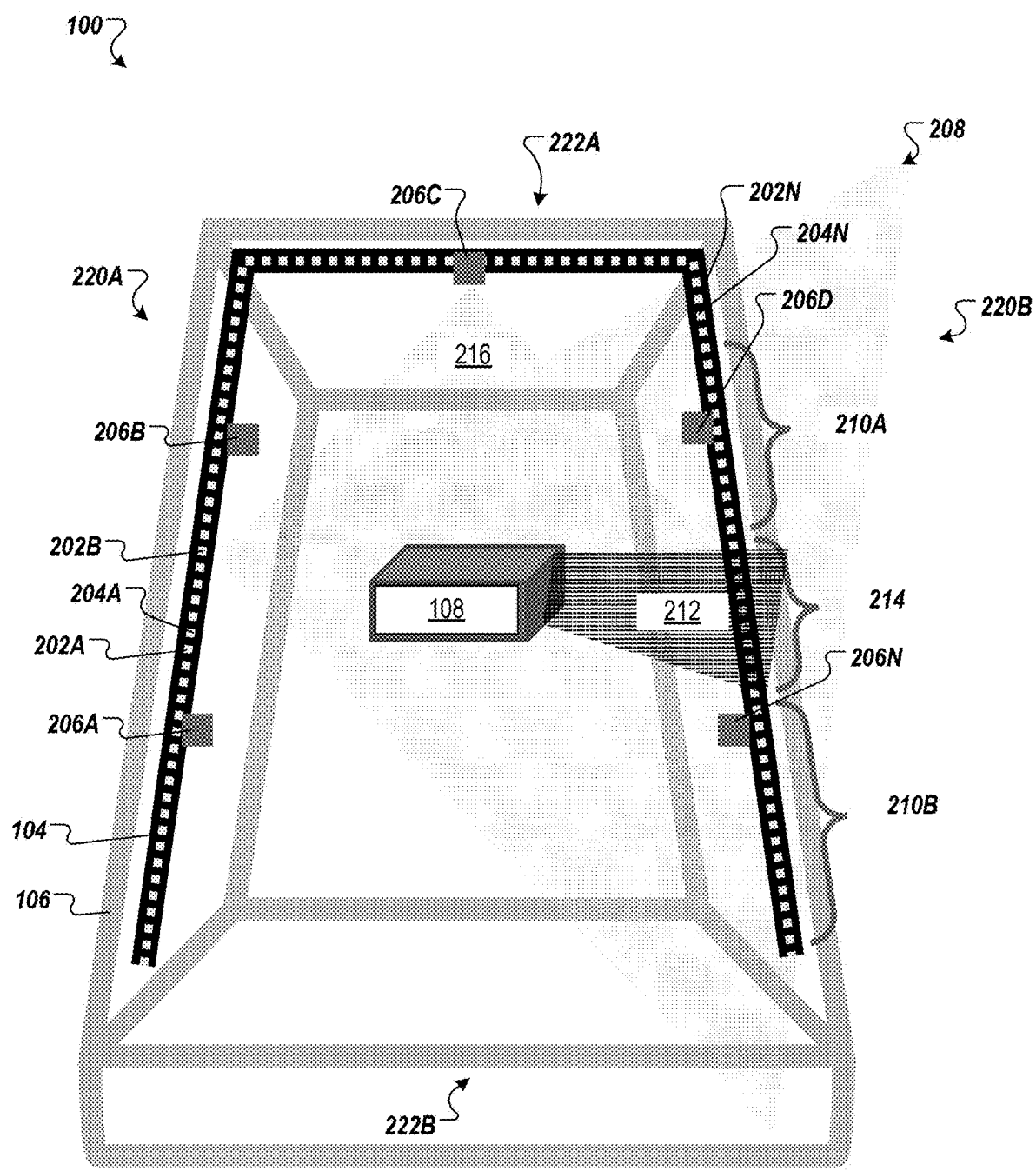
FIG. 2 is an illustrative top down view of the shopping cart when a product is added therein.
Figure 3:
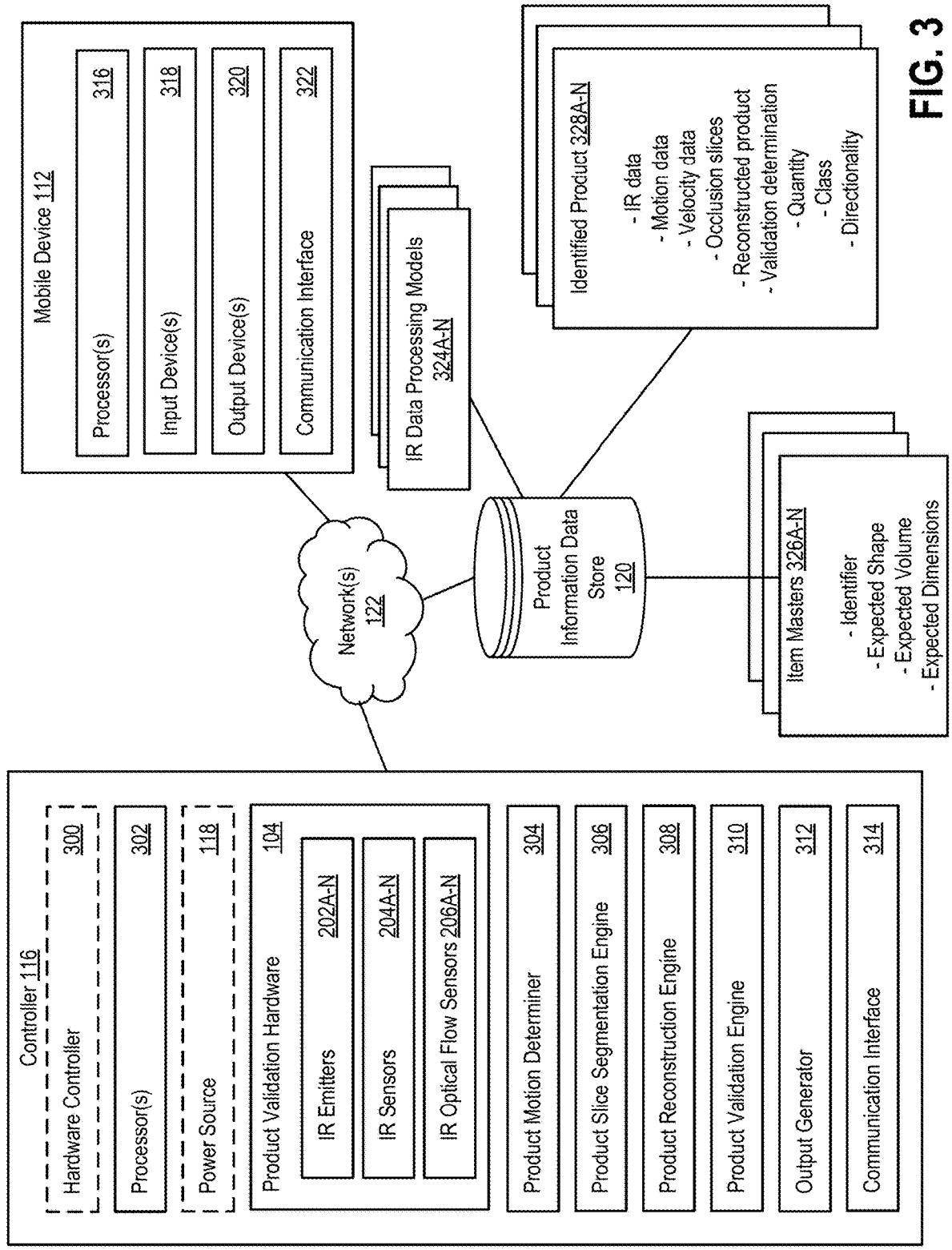
FIG. 3 is a system diagram of components that can be used to perform the disclosed techniques.

The product validation hardware 104, as described further in reference to FIGS. 2-3, can include IR emitters and IR sensors (e.g., receivers). In some implementations, the product validation hardware 104 can include lasers or other signals that are outside a visible light spectrum. The product validation hardware 104 can be positioned along a top perimeter 106 of the shopping cart 100 to define a top horizontal plane 114 of the cart 100. The product validation hardware 104 can be a single line of alternating IR emitters and IR sensors that are sufficiently spaced apart or together (e.g., 5 mm between IR emitter and IR sensor) to reliably detect occlusions across the plane 114 when the IR validation techniques are performed.

In some implementations, one or more other sensors can be used, such as color visual light sensors and white light sensors, which can be configured to detect colors of products as they enter the shopping cart 100. The detected colors for a product can be combined to determine an average color for the product. The controller 116 and/or the mobile device 112 can then validate the product based on determining whether the average color falls within expected color ranges for the product. After all, different frequencies of light can be used with the disclosed technology to determine pigments in packaging of products that can reflect IR light differently than other pigments. The determine of different pigments can be used as an additional signal to validate a product.

In some implementations, the shopping cart 100 can include a combination of IR emitters, IR sensors, and color visual light sensors. Clusters of a same type of sensor can be configured along the top perimeter 106 of the shopping cart 100. Some of the sensors in the cluster can have different filters to detect IR in addition to one or more colors, such as red, blue, green, etc. Any of these colors, including IR light, can then be detected by the sensors and used by the controller 116 and/or the mobile device 112 to validate a product as it passes into the shopping cart 100.

Although not depicted in FIG. 1A, the shopping cart 100 can also include one or more IR optical flow sensors along the top perimeter 106 that are sufficiently spaced apart/ together and configured to detect and track vertical and rotational motion of a product 108 as it passes through the top horizontal plane 114. The optical flow sensors can be configured to translate movement in a z dimension. Refer to FIG. 2 for further discussion about the IR optical flow sensors.

The optional controller 116 can be in communication (e.g., wired, wireless) with the mobile device 112 and/or the product validation hardware 104. The controller 116 can perform one or more of the techniques described herein. The controller 116 can include one or more processors, CPU, RAM, and/or I/O.

The optional power source 118 can provide power to one or more components of the shopping cart 100, including but not limited to the controller 116 and the product validation hardware 104. In some implementations, the power source 118 may also provide power to the mobile device 112 (e.g., to charge the device 112) while and/or when the mobile device 112 is mounted at the mounting fixture(s) 110.

The indicator(s) 140A-B can include one or more output devices (e.g., indicator lights, speakers, tactile devices, etc.) on or near the handle 102 of the shopping cart 100 and/or around a top perimeter of the cart 100 (e.g., a ring of upward-facing indicator lights around the horizontal plane 114). In general, the indicator(s) 140A-B can be configured to convey verification status information that pertains to an addition of an item to the cart 100, and/or an overall state of the cart 100. In some implementations, the indicator(s) 140A-B can be configured to provide verification status information to a user of the shopping cart 100 instead of, or in addition to, verification status information provided by the mobile device 112. For example, the indicator(s) 140A-B can include a first indicator that indicates a successful item verification (e.g., a green light, a chime tone, etc.), and can include a second indicator that indicates an unsuccessful item verification (e.g., a red light, a buzzer tone, etc.). In some implementations, the indicator(s) 140A-B can be configured to provide information that indicates an overall state of the shopping cart 100. For example, the indicator(s) 140A-B can include different indicators (e.g., different colored lights, different light intensities, and/or different flashing light patterns) that indicate whether the cart 100 is active, is inactive, is malfunctioning, is waiting for an item to be added, has detected that an item has been added (e.g., either with or without an indication of whether the item has been successfully or unsuccessfully verified), and/or other suitable cart states. As another example, the indicator(s) 140A-B can include different indicators for directing a user during a checkout process. For example, the indicator(s) 140A-B can include a first indicator (e.g., a green light) that indicates that a transaction is complete and that a customer may leave the store, a second indicator (e.g., a yellow light) that indicates that a user is to proceed to a station where a partial check of the cart contents is performed (e.g., by an employee), and a third indicator (e.g., a red light) that indicates that a user is to proceed to a manual checkout station where the entire cart contents are determined and the transaction is completed. In some implementations, the indicator(s) 140A-B can be an LED light bar and/or an LED light strip. One or more other light configurations can be used for the indicator(s) 140A-B.

FIG. 1B illustrates an example IR validation process as process as performed by the shopping cart 100 of FIG. 1A. One or more components depicted in FIG. 1B, such as the controller 116, the mobile device 112, the product validation hardware 104, and a product information data store 120 can communicate via network(s) 122. The network(s) 122 can provide communication via Wifi, Bluetooth technology, long range (LoRa), etc.

The IR validation process can begin when a user (e.g., shopper) scans the product 108 with their mobile device 112 (step A, 150). An application, for example, can be presented at the mobile device 112 and can provide the user with an option to scan products they wish to purchase. When the products are scanned, the products can be added to a virtual shopping cart and a transaction for a current shopping experience can be updated to include the scanned products. The user can therefore complete the transaction (e.g., complete a retail checkout process) at the mobile device 112.

The user can scan a product identifier, such as a barcode, of the product 108 with their mobile device 112. Using the scanned identifier, the mobile device 112 can retrieve product information from the product information data store 120 (step B, 152). In other words, the mobile device 112 can request information for a product that is associated with the scanned product identifier. The information can include size and volume data. The information can also include product type, price, relevant promotions/offers, etc. The mobile device 112 can transmit the retrieved product information to the controller 116 (step C, 154). Once the user scans the product 108, the user can put the product 108 in the shopping cart 100.

The product validation hardware 104 can detect the product 108 entering the shopping cart (step D, 156). The product validation hardware 104 can be operating in a low power state until an IR beam is detected (e.g., by the IR sensors, the IR optical flow sensors, and/or one or more other sensors of the shopping cart 100) as being broken by movement of the product 108 along/through the top horizontal plane 114 of the shopping cart 100. The product validation hardware 104 can transmit a notification to the controller 116 when the detection is made in step D (156).

Accordingly, the controller 116 can activate the product validation hardware 104 (step E, 158). In some implementations, the product validation hardware 104 can be automatically activated without notifying the controller 116 when the detection is made in step D (156). Activating the product validation hardware 104 can include activating one IR emitter at a time to emit light along the top horizontal plane 114 of the shopping cart 100.

The IR sensors can detect and collect IR data as the IR emitters are activated one at a time and the product 108 passes through the top horizontal plane 114 of the shopping cart (step F, 160). The IR data can represent shadows or other occlusions formed in a light plane by the product 108, where the product 108 obstructs the light emitted by the IR emitters from being detected by the IR sensors. The IR data can include a shadow map for the product 108 as the product 108 moves into the shopping cart 100.

The IR data that is collected (step F, 160) can also include motion and/or rotational data detected by one or more optical flow sensors of the shopping cart 100 (e.g., refer to FIG. 2). The motion and/or rotational data can be used by the controller 116 to determine a velocity of the product 108 as it enters the shopping cart 100. The velocity can be used to reconstruct the product 108.

In some implementations, IR data can be collected from a plurality of the IR sensors after an IR emitter is activated then transmitted to the controller 116 (step G, 162). Then, a second IR emitter can be activated (step E, 158), IR data can be collected again (step F, 160), the IR data can be transmitted to the controller 116 (step G, 162), and the process can repeat until all the IR emitters have been activated and/or the product 108 is detected as no longer passing through the top horizontal plane 114 of the shopping cart 100. In some implementations, all the IR data that is collected in step F (160) from activating the IR emitters one at a time can be transmitted in batch to the controller 116 (step G, 162).

Using the IR data, the controller 116 can reconstruct the product 108 in 3D space (step H, 164). The controller 116 can also reconstruct the product 108 in one or more other multidimensional spaces. In some implementations, the controller 116 can use one or more models that were trained using machine learning to reconstruct a product using IR data. The controller 116 can reconstruct the product 108 in slices as IR data is received from activating the IR emitters one at a time. For example, the velocity of the product 108 can be used to identify which IR data can be used to generate occlusion slices of the product 108 in 3D space. The slices can be joined together into a 3D reconstruction of a rigid body of the product 108. Normalization and filtering techniques can also be employed to further refine reconstruction of the product 108 in 3D space, as described further in FIGS. 5A-C.

Once the product 108 is reconstructed, the controller 116 can validate the product 108 (step I, 166). The controller 116 can determine whether the reconstructed product matches or is similar to (e.g., within predetermined ranges of) the product information for the scanned product 108. As described further herein, the controller 116 can determine product class correctness based on whether the reconstructed product's geometry is sufficiently close to expected shape and volume data of the scanned product 108 or multiples of the scanned product 108. The controller 116 can determine product quantity correctness based whether the reconstructed product geometry is sufficiently close to a multiple of the scanned product 108. Moreover, the controller 116 can determine a directionality of the scanned product 108, such as whether the product 108 is being added to the shopping cart 100 or removed therefrom.

Using the disclosed techniques, the controller 116 can determine whether the product 108 that is added to the shopping cart 100 actually matches the product identifier that is scanned by the mobile device 112 in step A (150). If there is a match, then the product 108 can be validated. For example, the guest's transaction can be updated or otherwise verified to reflect the correct product, quantity of the product being purchased, and price. This can be beneficial to expedite a retail checkout process such that the transaction can be completed at the mobile device 112 and the guest can simply walk out of the retail environment with the product 108 in the shopping cart 100 and without having to wait in line at a checkout station/lane. If, on the other hand, there is not a match, then the product 108 cannot be validated. The guest can be notified at the mobile device 112 to rescan the product 108 or put the correct product in the shopping cart 100. One or more other notifications can also be generated as described throughout this disclosure.

Once the product 108 is validated in step I (166), the product validation determination can be transmitted to and outputted at the mobile device 112 (step J, 168). Although not depicted, in some implementations, the product validation determination can be transmitted to another computing system, device, and/or data store. For example, the determination can be transmitted to a user device of a retail environment employee who can be tasked with reviewing potential security vulnerabilities and/or suspicious activity in the retail environment. If the controller 116 determines that the product 108 does not match the identifier that was scanned by the guest, then the controller 116 can transmit a notification to the user device of the retail environment employee. The retail environment employee may decide to monitor the guest to determine whether the guest is engaging in suspicious activity, such as ticket switching.

In some implementations, steps A-B (150-152) can be performed at a different time and/or during one or more other steps described in FIG. 1B. Sometimes, one or more of the steps can be performed by one device, such as the mobile device 112, or by multiple devices, as depicted in FIG. 1B. In some implementations, one or more of the steps can be performed by a cloud-based system and/or in a cloud-based service. As an illustrative example, steps E, H, and/or I (158, 164, 166, respectively) can be performed by the mobile device 112 instead of the controller 116. As a result, the disclosed techniques can leverage processing power and computational resources of the mobile device 112, which can result in quick and efficient IR validation determinations to be made in real-time. As another example, the controller 116 can reconstruct the product in step H (164) and transmit the reconstruction to the mobile device 112. The mobile device 112 can then validate the product in step I (166) by determining whether the reconstructed product matches or is similar to the retrieved product information.

FIG. 2 is an illustrative top down view of the shopping cart 100 when the product 108 is added therein. As shown and described in reference to FIGS. 1A-B, the product validation hardware 104 of the shopping cart 100 can include IR emitters 202A-N and IR sensors 204A-N alternating in a single line along the top perimeter 106 of the shopping cart 100. The IR emitters 202A-N and IR sensors 204A-N can be sufficiently distanced from each other (e.g., 5 mm apart) to generate IR data that can be used to reconstruct the product 108 in multi-dimensional (e.g., 3D) space. Rather than being inline, in some implementations, the IR emitters 202A-N and IR sensors 204A-N can be stacked along the top perimeter 106 of the shopping cart 100. In yet some implementations, the IR emitters 202A-N and IR sensors 204A-N can be offset from each other around the top perimeter 106 of the shopping cart 100.

The product validation hardware 104 can also include IR optical flow sensors 206A-N. The IR optical flow sensors 206A-N can be sufficiently spaced around the perimeter 106 of the shopping cart 100 to accurately detect rotational and/or motion data of the product 108 as the product 108 moves into the shopping cart 100. In this example shopping cart 100, two IR optical flow sensors 206A-N can be positioned each on opposing sides 220A and 220B of the shopping cart 100. A front end 222A of the shopping cart 100 can include one of the IR optical flow sensors 206A-N. One or more other configurations and/or quantities of IR optical flow sensors 206A-N can also be used for the shopping cart 100. For example, in some implementations, an IP optical flow sensor can be included in each corner of the shopping cart 100. In some implementations, fewer IP optical flow sensors can be included in the shopping cart 100 than what is shown in FIG. 2. Moreover, in some implementations, the product validation hardware 104 can also continue along the perimeter 106 of the end 222B of the shopping cart 100, which can be near a handle of the shopping cart 100.

In operation, once the product 108 is detected as entering the shopping cart 100 (e.g., even a smallest portion of the product 108 crosses the top horizontal plane of the shopping cart 100 and therefore breaks an IR beam), the IR emitters 202A-N can be activated one at a time. They can be activated in a clockwise direction around the perimeter 106 of the shopping cart 100 to build a shadow map of the product 108 from every angle as it moves through the top horizontal plane and into the shopping cart 100. The IR emitters 202A-N can be rapidly activated (e.g., dozens of IR emitters 202A-N can be sequentially activated within seconds) to capture IR data of the product 108 from every angle. While the product 108 is moving into the shopping cart 100, one or more of the IR optical flow sensors 206A-N can detect rotational and/or motion data of the product 108, which can be used to more accurately reconstruct the product 108 in multi-dimensional space. In some implementations, multiple IR emitters 202A-N can be emitted at a same time. For example, IR emitter 202A on the left side 220A of the shopping cart 100 can be activated at or around a same time as IR emitter 202N is activated on the right side 220B of the shopping cart 100.

In the example of FIG. 2, IR emitter 202B on the left side 220A of the shopping cart 100 has been activated. The IR emitter 202B generates a sweeping IR light plane 208, which can be detected by one or more IR sensors 204A-N on the opposite, right side 220B of the shopping cart 100. The IR sensors 204A-N on the right side 220B of the shopping cart 100 can detect high intensity signals 210A-B as well as at least one low intensity signal 214. The high intensity signals 210A-B can indicate portions of the sweeping IR light plane 208 that are unobstructed by the product 108. After all, as the product 108 passes through the top horizontal plane of the shopping cart 100, the product can prevent some of the light emitted by the IR emitter 202B from being detected by the IR sensors 204A-N on the right side 220B of the shopping cart 100. In fact, the product 108 can generate a shadow 212, which can be detected by the IR sensors 204A-N as the low intensity signal 214. IR data that is collected for the high intensity signals 210A-B and the low intensity signal 214 can be used to generate a shadow map of the product 108 and occlusion slices of the product 108 that are then used to reconstruct the product 108 in multi-dimensional space.

Additionally, IR optical flow sensor 206C can be activated to detect rotational and/or motion data of the product 108. The IR optical flow sensor 206C can generate a motion plane 216, which can indicate relative distance between the sensor 206C and the product 108 as the product 108 moves into the shopping cart 100. The data collected by the sensor 206C can then be used to determine a velocity of the product 108. As described herein, the velocity 108 and other rotational and/or motion data can be used to identify IR data from the IR sensors 204A-N for accurate generation occlusion slices of the product 108 and 3D reconstruction of the product 108. For example, the rotational and/or motion data can be used to determine a rotation of the product 108 as it enters the cart and then un-rotate any of the occlusion slices to generate a normalizing 3D reconstruction of the product 108. In some implementations, all IP optical flow sensors 206A-N can be activated at a same time, which can provide for a higher degree of confidence in detected rotational and/or motion data.

FIG. 3 is a system diagram of components that can be used to perform the disclosed techniques. The controller 116, mobile device 112, and product information data store 120 can communicate via the network(s) 122, as described above. The controller 116 can be part of a shopping cart, such as the shopping cart 100. In some implementations, the controller 116 can be a shopping cart computing system that is separate from the shopping cart and/or in communication with one or more components of the shopping cart. The shopping cart computing system can be a cloud-based system and/or service. In such a scenario, the controller 116 can, for example, perform operations for multiple shopping carts. Moreover, as described herein, in some implementations, the controller 116, or components of the controller 116, can be part of another computing system. One or more of the techniques performed by components of the controller 116 can also be performed by other computing systems, such as the mobile device 112.

The controller 116 can include an optional hardware controller 300, processor(s) 302, optional power source 118, product validation hardware 104, product motion determiner 304, product slice segmentation engine 306, product reconstruction engine 308, product validation engine 310, output generator 312, and communication interface 314.

The hardware controller 300 can be configured to activate the product validation hardware 104 when a product is detected as entering the shopping cart. In some implementations, the product validation hardware 104 can automatically activate without the hardware controller 300. The processor(s) 302 can be configured to perform one or more of the operations described throughout this disclosure. The optional power source 118, as described in reference to FIGS. 1A-B, can provide power to one or more components of the shopping cart, including one or more components of the controller 116.

The product validation hardware 104 can be activated (e.g., automatically or by the hardware controller 300 upon detection, by one or more IR sensors 204A-N or other sensors attached to the shopping cart, of an IR beam being broken by the product entering the cart) to collect information about a product as it passes through a top horizontal plane of the shopping cart and enters the shopping cart. For example, the product validation hardware 104 can include IR emitters 202A-N, IR sensors 204A-N, and IR optical flow sensors 206A-N. The IR emitters 202A-N and IR sensors 204A-N can be alternating in a single line along a top perimeter of the shopping cart. The IR optical flow sensors 206A-N can be interspersed along the single line at the top perimeter of the shopping cart at predetermined distances/intervals.

As described throughout this disclosure, the IR emitters 202A-N can be activated one at a time to generate light across the top horizontal plane of the shopping cart as the product passes through the plane and into the cart. The generated light can be detected by the IR sensors 204A-N as IR data, which can be used to generate a shadow map of the product. The IR data collected by the IR sensors 204A-N can be used to generate occlusion slices for the product by the product slice segmentation engine 306. Thus, IR data collected by the IR sensors 204A-N can be transmitted to the product slice segmentation engine 306 for processing. The IR data collected can also be stored in a corresponding identified product 328A-N data record in the product information data store 120.

Moreover, as the product moves through the top horizontal plane and into the shopping cart, the IR optical flow sensors 206A-N can detect rotational and/or motion data of the product. Such data can be transmitted to the product motion determiner 304 for processing. Such data can also be stored as motion data in the corresponding identified product 328A-N data record in the product information data store 120.

The product motion determiner 304 can be configured to determine velocity of the product as it moves into the cart. The velocity can then be transmitted to the product slice segmentation engine 306 and used to generate occlusion slices at regular, predetermined intervals. The determiner 304 can receive rotational and/or motion data from the IR optical flow sensors 206A-N. This data can indicate positioning of the IR optical flow sensors 206A-N relative to the product as the product moves into the cart at different time intervals. In some implementations, the determiner 304 can poll the IR optical flow sensors 206A-N at predetermined rates/intervals for product movement, direction, and/or rate data. The predetermined rates/intervals can be sufficient enough such that the IR optical flow sensors 206A-N can accurately capture product position translation information as the product passes through the top horizontal plane of the shopping cart.

Because of variable distances between the IR optical flow sensors 206A-N and the product, a relative translation rate or other data received from the IR optical flow sensors 206A-N may not directly translate into velocity of the product. The determiner 304 can use trigonometric functions to determine relative product and IR optical flow sensors 206A-N positioning over time. The determiner 304 can, for example, generate a curve indicating product position over time as the product passes through the top horizontal plane of the shopping cart. The curve can also be a map of time values corresponding to a constant change in product position (e.g., 5 mm). The determiner 304 can identify a velocity of the product using the curve. The curve and/or determined velocity can be stored as velocity data in the corresponding identified product 328A-N data record in the product information data store 120.

The product slice segmentation engine 306 can be configured to determine occlusion slices for the product based on the IR data received from the IR sensors 204A-N and the velocity or the curve determined by the product motion determiner 304. The occlusion slices can then be transmitted to and used by the product reconstruction engine 308 to reconstruct the product in multidimensional space, such as 3D space. For example, the engine 306 can receive the curve of position over time for the product from the product motion determiner 304. The determiner 306 can analyze the curve to determine which particular sweeps of IR data collected by and received from the IR sensors 204A-N should be used to generate occlusion slices. The determiner 306 can then generate all the slices needed to reconstruct the entire product. The slices can also be stored as occlusion slices in the corresponding identified product 328A-N data record in the product information data store 120.

The product reconstruction engine 308 can be configured to reconstruct the product in multidimensional (e.g., 3D) space using the occlusion slices generated by the product slice segmentation engine 306. The engine 308 can receive the occlusion slices from the engine 306. In some implementations, the engine 306 can store the slices in a data store, such as the product information data store 120. The engine 308 can then access those slices from the data store to reconstruct the product. The reconstructed product can be stored in the corresponding identified product 328A-N in the product information data store 120.

To reconstruct the product, the engine 308 can also retrieve and apply one or more IR data processing models 324A-N from the product information data store 120. The models 324A-N can be trained using training data sets of (i) slices of different products and (ii) known reconstructions of the different products. For example, the models 324A-N can be trained by inputting the slices of different products and the known reconstructions of the different products into the models 324A-N as if the models 324A-N are generating the product reconstructions. Output from the models 324A-N can be compared to the known reconstructions of the different products to determine accuracy of the models 324A-N. The models 324A-N can be continuously trained until the models 324A-N achieve a predetermined level of accuracy. In some implementations, the models 324A-N can be continuously trained even after they achieve the predetermined level of accuracy. Training of the models 324A-N can be performed by a remote computing system and/or cloud-based service. In some implementations, the controller 116 can train one or more of the models 324A-N.

In some implementations, the models 324A-N can be trained using data about various types of items as they enter carts at different velocities, speeds, and/or directions. If enough training data is collected showing variations of items entering carts at various speeds, clusters can be generated of typical or expected speeds at which different items can enter a cart (e.g., items slowly being put into the cart, gently placed in the cart, thrown into the cart, etc.). During runtime, for example, velocity or other speed data may not be required to generate slices of an item—instead, the velocity can be inferred using one or more of the models 324A-N.

Reconstructing the product, by the engine 308, can include joining together the occlusion slices for the product into a 3D representation of a rigid body of the product. The engine 308 can also normalize orientation of the 3D representation of the product with a standard coordinate plane. In some implementations, the engine 308 can use a set of primitive shapes (e.g., boxes, cylinders, etc.) to bias and constrain the 3D reconstruction of the product to filter out any noise. The engine 308 may also, in some implementations, detect and semantically separate consumers', or other users', hands from the reconstruction of the product. Finally, as mentioned above, the engine 308 can store the normalized reconstruction of the product in the corresponding identified product 328A-N.

The product validation engine 310 can be configured to validate the reconstructed product and determine whether it matches or is similar to a product that is scanned by the mobile device 112. In some implementations, the product validation engine 310 can be configured to operate at the mobile device 112 instead of the controller 116.

The product validation engine 310 can receive a unique identifier (e.g., barcode, UPC, SKU, or other uniquely identifying code) from the mobile device 112 for a product that is scanned by the mobile device 112. The product validation engine 310 can retrieve item masters 326A-N data record(s) from the product information data store 120 that matches/is associated with the unique identifier. In some implementations, the mobile device 112 can retrieve the corresponding item master 326A-N data record and transmit that data record to the product validation engine 310. The engine 310 can use the corresponding item master 326A-N data record to compare expected information for the scanned product with the reconstructed product.

If the reconstructed product matches or is similar to (e.g., within a predetermined threshold range) the expected information in the data record, then the engine 310 can validate the product. Validating the product can mean that the guest can continue adding products to the shopping cart and can complete the retail checkout process without having to wait in line at a checkout lane/station. If the reconstructed product does not match or is not similar to the expected information, then the engine 310 can identify a product mismatch and notify the guest and/or another relevant user (e.g., retail environment employee). The guest may, for example, not be able to continue scanning products with their mobile device 112 until they resolve the product mismatch (by putting the correct product/quantity of the product in the shopping cart, by scanning the correct product, etc.).

As described herein, the engine 310 can compare expected shape, volume, and/or dimensions data for the item master 326A-N to the reconstructed product. The engine 310 can determine whether the reconstructed product is a correct class (e.g., classification, category) as the item master 326A-N, a correct quantity of the reconstructed product, and a directionality of the reconstructed product. The engine 310 can store the validation, quantity, class, and directionality determinations in the corresponding product 328A-N data record in the product information data store 120.

The output generator 312 can be configured to generate output based on the validation process described herein. For example, the generator 312 can receive the validation, quantity, class, and directionality determinations from the product validation engine 310. The generator 312 can also retrieve such determinations from the product information data store 120. The generator 312 can generate corresponding notifications, messages, and/or alerts. In some implementations, the output generator 312 can be configured to operate at the mobile device 112 or another computing system and/or cloud-based service.

As illustrative examples, the generator 312 can create a message that is transmitted to and outputted at the mobile device 112 notifying the guest that they need to put the correct product in their cart (based on a determination that the product is not validated). As another example, the generator 312 can create a message that notifies the guest of class, quantity, and directionality of the product that the guest just added to the shopping cart. In some implementations, the guest may be prompted to verify/confirm this information before scanning the next product with their mobile device. In some implementations, the generator 312 can create output that can be transmitted to a computing device of other relevant users, such as retail environment employees and/or security personnel. Such output can be used by the relevant users to identify and remediate product shortages in the retail environment, to identify and monitor suspicious activity of the guests, and/or to address potential suspicious activity (e.g., check the guest's shopping cart before they leave the retail environment).

The mobile device 112 can be a mobile phone, smartphone, cell phone, tablet, laptop, computer, or other user computing device. The mobile device 112 can be used by a guest in the retail environment to scan products that the guest desires to purchase. Functionality described herein can be presented in a mobile application or other software suite presented at the mobile device 112. The mobile device 112 can be used by the guest to apply offers, promotions, and/or coupons to their transaction. A virtual shopping cart can be accessible at the mobile device 112 and can include all the products that the guest scans with the mobile device 112 and puts in their shopping cart. In some implementations, the virtual shopping cart can also include virtual products that the guest selects from an online retail environment application presented at the mobile device 112 that the guest desires to purchase. The guest can view their virtual shopping cart at the mobile device 112 and can complete the transaction directly via the mobile device 112. As a result, the guest may not have to wait in line at a checkout lane/station in order to complete the transaction checkout process. Instead, the guest can simply exit the retail environment with their purchased products in the shopping cart.

The mobile device 112 can include processor(s) 316, input device(s) 318, output device(s) 320, and a communication interface 322. The processor(s) 316 can be configured to execute one or more of the processes/techniques described herein. For example, the processor(s) 316 can be configured to execute instructions that cause the mobile device 112 to validate a reconstructed product and/or generate output about the validation determination. The input device(s) 318 can include one or more of a touch screen display, keyboard, mouse, microphone, and/or imaging sensors.

The input device(s) 318 can receive input from the guest. For example, the guest can scan an identifier on packaging of a product using a camera of the mobile device 112 (e.g., one of the input device(s) 318). The guest can also provide input indicating a quantity of a particular type of produce on a touch screen display of the mobile device 112.

The output device(s) 320 can present information in GUI displays at the mobile device 112. The output device(s) 320 can include display screens, speakers, and/or other types of devices for delivering content/information to a user. For example, the output device(s) 320 can be an LCD touch screen that can present an application or software suite that allows the guest to scan products, add products to their virtual shopping cart, access account information, review transactions, and/or complete transactions. The output device(s) 320 can also provide notifications, messages, and/or alerts to the guest indicating whether a product is validated or not. The output device(s) 320 can provide one or more other forms of output to the guest, as described herein.

Finally, the communication interfaces 314 and 322 can provide for communication between the components described herein.

Figure 4:
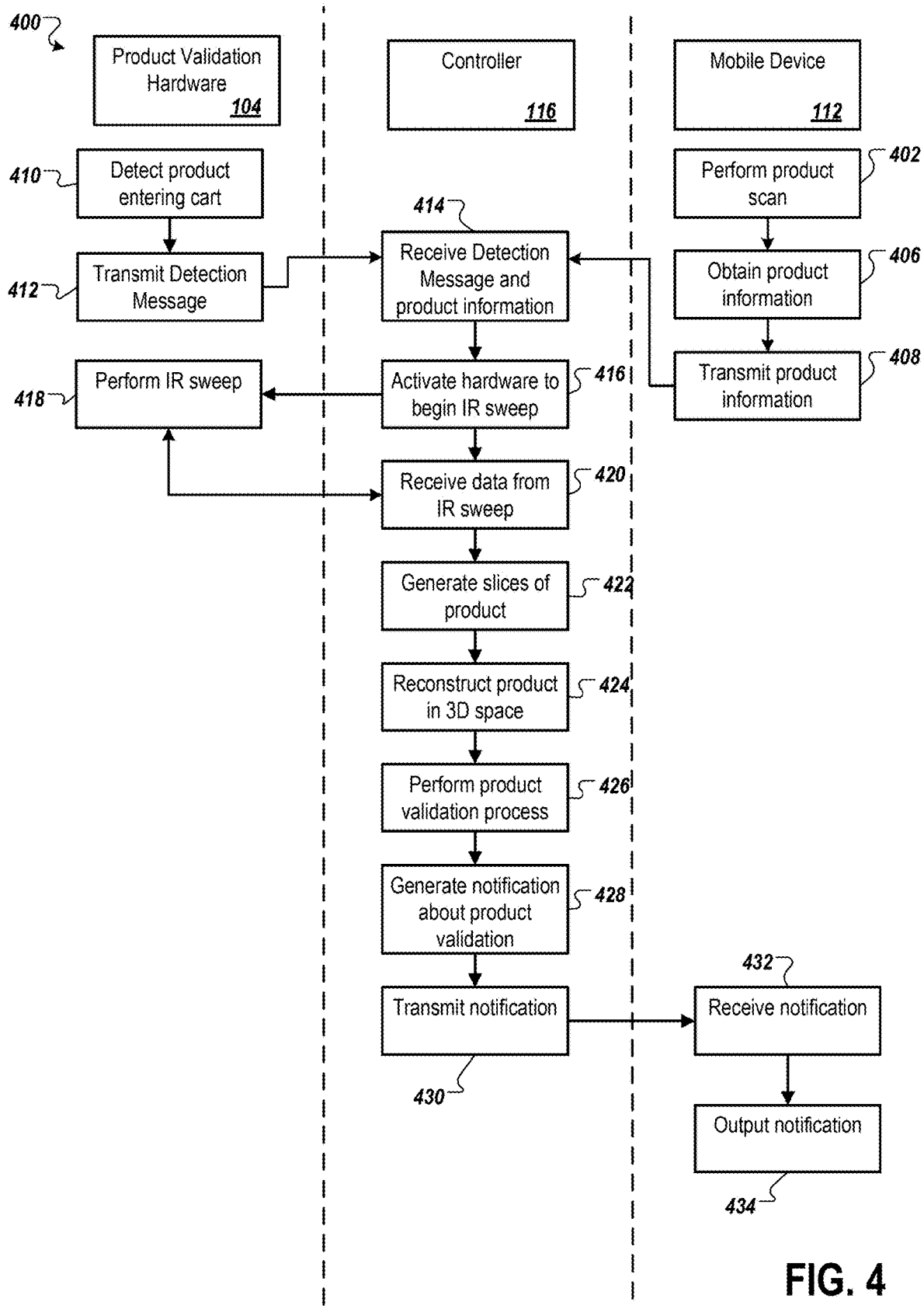
FIG. 4 is a swimlane diagram of a process for validating a product that is added to a shopping cart.

FIG. 4 is a swimlane diagram of a process 400 for validating a product that is added to a shopping cart. The process 400 can be used to determine whether a product that is scanned by a guest's mobile device matches a product that is placed in the guest's shopping cart. As described herein, the process 400 can be triggered by a product scan at the mobile device. The process 400 can also be triggered by detection of the product entering the shopping cart. Moreover, as described herein, one or more blocks in the process 400, such as validating the product added to the shopping cart, can be performed by the mobile device instead of a controller of the shopping cart. Blocks of the process 400 can be performed by the product validation hardware 104, the controller 116, and/or the mobile device 112. In some implementations, one or more other components, computing systems, and/or network of systems/devices can perform one or more of the blocks in the process 400.

Referring to the process 400, a product scan can be performed by/at the mobile device 112 in 402. As described herein, the guest can scan, with the mobile device 112, a unique identifier of the product the guest desires to purchase.

The mobile device 112 can obtain product information in 406. Once the guest scans the unique identifier, the mobile device 112 can use object character recognition (OCR) or other similar techniques to identify the unique identifier in the scanned data (e.g., an image of a portion of the product having the unique identifier). The mobile device 112 can request/retrieve, from a data store (e.g., the product information data store 120) product information that corresponds to the unique identifier. As described herein, the product information can include expected shape and/or volume data for the product that is identified by the scanned unique identifier.

In 408, the mobile computing device 112 can transmit the product information to the controller 116. The controller 116, as described further below, can compare the product information to a reconstruction of the product to validate the product. In some implementations, the mobile device 112 can transmit the unique identifier of the scanned product to the controller 116 and the controller 116 can obtain the corresponding product information (406). In yet some implementations, the mobile device 112 may obtain the corresponding product information (406) and maintain that information in temporary storage (e.g., RAM) at the mobile device 112 such that the mobile device 112 can use that information to validate the product.

The product validation hardware 104 can detect the product entering the shopping cart in 410. The product can be detected while the product validation hardware 104 is operating in a low power processing state. One or more IR sensors can detect an IR beam being broken at a top horizontal plane of the shopping cart, which can indicate that a product is entering the cart. As another example, one or more IR optical flow sensors can detect motion at the top horizontal plane of the shopping cart, which can also indicate that a product is entering the cart. Block 410 can occur at a same time as any one or more of blocks 402-408. In some implementations block 410 can occur before any one or more of the blocks 402-408. As depicted in FIG. 4, block 410 can also occur after any one or more of the blocks 402-408.

The product validation hardware 104 can transmit a detection message to the controller 116 in 412. In other words, the product validation hardware 104 can alert the controller 116 that a product is entering the cart and that an IR sweeping process should begin. Accordingly, the controller 116 can receive the detection message in 414. In 414, the controller 116 can also receive the product information from the mobile device 112. The controller 116 can receive the detection message and the product information at a same time or at different times.

In response to receiving the detection message in 414, the controller 112 can activate the product validation hardware 104 to being an IR sweep (416). Activating the product validation hardware 104 can cause the hardware 104 to operate in a high processing state throughout the IR sweep. As described throughout, IR emitters can be activated one at a time to emit IR light.

The product validation hardware 104 can perform the IR sweep in 418. IR sensors on an opposite side of the cart from the activated IR emitter can detect IR intensity data. The IR intensity data can include shadows or other low intensity signals indicative of emitted light being obstructed by the product passing through the top horizontal plane of the shopping cart. The IR intensity data can also include unobstructed light or high intensity signals of emitted light indicating areas along the top horizontal plane that are not occupied by the product.

The product validation hardware 104 can continue to perform the IR sweep in 418 (e.g., individually activating IR emitters) until all of the IR emitters have been individually activated and corresponding IR data has been collected and/or the product is no longer detected as breaking an IR beam or otherwise moving into the cart.

In some implementations, performing the IR sweep in 418 can also include collecting rotational and/or motion data of the product by one or more IR optical flow sensors. Such data can be collected at regular, predetermined intervals. The collection of such data can be offset with times at which the IR emitters are activated and IR data is collected by the IR sensors to reduce potential noise. The rotational and/or motion data can be used by the controller 116 to determine a velocity of the product as it enters the shopping cart. The velocity can be used to generate occlusion slices representing the product, as described further below.

In some implementations, the product validation hardware 104 can perform the IR sweep in 418 without being activated by the controller 116 in 416. Instead, the product validation hardware 104 can be automatically activated based on detection of the product entering the cart in 410. Optionally, in some implementations, the product validation hardware 104 can transmit the detection message to the controller in 412 merely to notify the controller 116 that the product is detected and that the product validation hardware 104 is going to automatically begin the IR sweep of 418.

The controller 116 can receive data from the IR sweep in 420. As described throughout this disclosure, the controller 116 can receive IR data (e.g., IR intensity data) from one or more IR sensors every time that an IR emitter is activated. The controller 116 can sometimes receive the IR data from the IR sensors in batch(es), after a predetermined quantity of the IR emitters have been activated one by one. The controller 116 can also receive rotational and/or motion data from the IR optical flow sensors in 420.

The controller 116 can generate slices (e.g., occlusion slices) of the product using the IR sweep data (422). As mentioned throughout, the controller 116 can use the determined velocity to identify which IR data accurately correlates to a portion of the product as the product passes through the top horizontal plane of the shopping cart. The identified IR data can then be used to generate slices of the product at different time intervals.

The controller 116 can reconstruct the product in 3D space (424). As mentioned throughout, the controller 116 can stitch together the slices of the product that were generated in 422. The controller 116 can use one or more machine learning trained models to stitch together the slices of the product into a 3D space. The controller 116 can also normalize the reconstructed product such that the product appears in a normal orientation within a standard coordinate systems. In some implementations, the controller 116 may also use primitive shapes, such as boxes, cylinders, and spheres, to bias and constrain the reconstruction of the product in 3D space. As a result, the controller 116 may filter out potential noise. Further, in some implementations, the controller 116 can detect and semantically remove hands and other body parts of the guest from the product that is reconstructed in 3D space. As described herein, the controller 116 can also reconstruct the product in one or more other multidimensional spaces, including but not limited to 2D, 4D, 5D, etc. spaces.

The controller 116 can perform a product validation process in 426. As described herein, the controller 116 can determine whether the reconstructed product matches or is similar to the product information for the scanned product that was obtained in blocks 402-408. The controller 116 can also determine whether a class (e.g., classification, category) of the reconstructed product is correct, a quantity of the reconstructed product that is being added to the guest's shopping cart, and a directionality of the reconstructed product. In some implementations, the product validation process in 426 can be performed by the mobile device 112.

In 428, the controller 116 can generate a notification about the product validation. As described throughout this disclosure, the notification can indicate that the product scanned by the guest does not match the product that was placed in the shopping cart. The notification can include one or more instructions/suggestions that can be performed by the guest to scan the correct product or put the correct product in the shopping cart. In some implementations, the notification can indicate that the product scanned matches the product placed in the cart. In some implementations, a notification may not be generated if there is a match. Instead, the guest can continue scanning products at the mobile device 112 and eventually complete the transaction checkout process at the mobile device 112 instead of at a checkout lane/station. The controller 116 may also generate notifications about the product validation that can be transmitted to a computing device of other relevant users, such as retail environment employees. The relevant users can review the notifications to identify and respond to product shortages and/or to monitor and response to potentially suspicious activity of guests in the retail environment. In some implementations, block 428 can be performed by the mobile device 112.

Moreover, in some implementations, generating the notification can include generating a confidence value indicating how many products in the shopping cart are validated versus how many products in the shopping cart are not validated.

Every time the controller 116 validates a product in 426, the controller 116 can determine a confidence value indicating likelihood that the product is in fact validated. In block 428, for example after all the products have been added to the shopping cart, the controller 116 can aggregate the confidence values for all of the products. The controller 116 can generate a notification based on the aggregated confidence value. For example, the controller 116 can determine that the confidence value is less than a threshold level, which means most of the products have been validated, if not all. The controller 116 can generate a notification that appears as an in-app notification at the mobile device 112 instructing the guest to put the correct products in the cart. As another example, the controller 116 can determine that the confidence value exceeds a threshold level, which means many of the products in the shopping cart have not been validated. The controller 116 can generate a notification or message to be sent to the computing device of a retail employee, prompting the retail employee to check the guest's shopping cart before they leave the retail environment.

The controller 116 can then transmit the notification to the mobile computing device 112 (430). The mobile device 112 can receive the notification (432) and output the notification (434). Thus, the notification can be presented to the guest at the mobile device 112. In some implementations, the guest may not be able to continue scanning products until they respond to the notification presented at the mobile device 112. The notification can be outputted in a variety of ways (434). For example, the notification can be outputted as an in-app prompt on a screen of the mobile computing device 112. The notification can also be outputted as a haptic response at the mobile device 112 and/or a sound/noise at the mobile device 112. In some implementations, the notification can be outputted at/by the shopping cart. As an illustrative example, the notification can be outputted as a light that is activated by the shopping cart. A green light can be activated when the product has been validated. A red light can be activated when the product was not validated. A flashing light can also indicate that the product was not validated.

The process 400 can be performed for each product that is scanned by the mobile device 112 and/or detected as entering or being removed from the shopping cart by the product validation hardware 104. In some implementations, blocks 414-430 can be performed by another computing system, such as a remote computer, cloud-based service, or other device/system that may be associated with the retail environment and/or a network of retail environments. As described herein, one or more of the blocks in the process 400 can also be performed by other systems and/or devices.

Figure 5A:
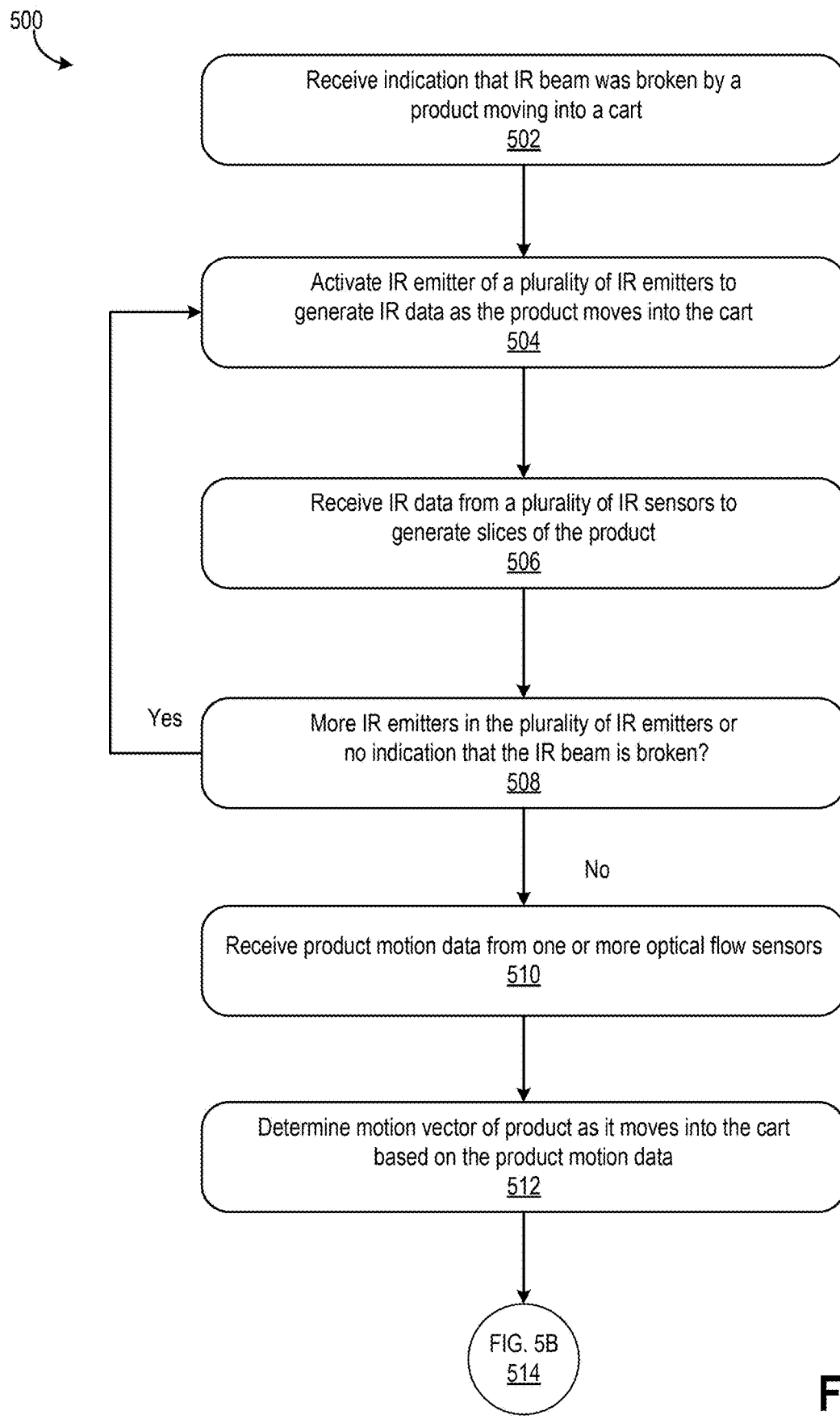
FIGS. 5A-C is a flowchart of a process for validating a product that is added to a shopping cart.
Figure 5B:
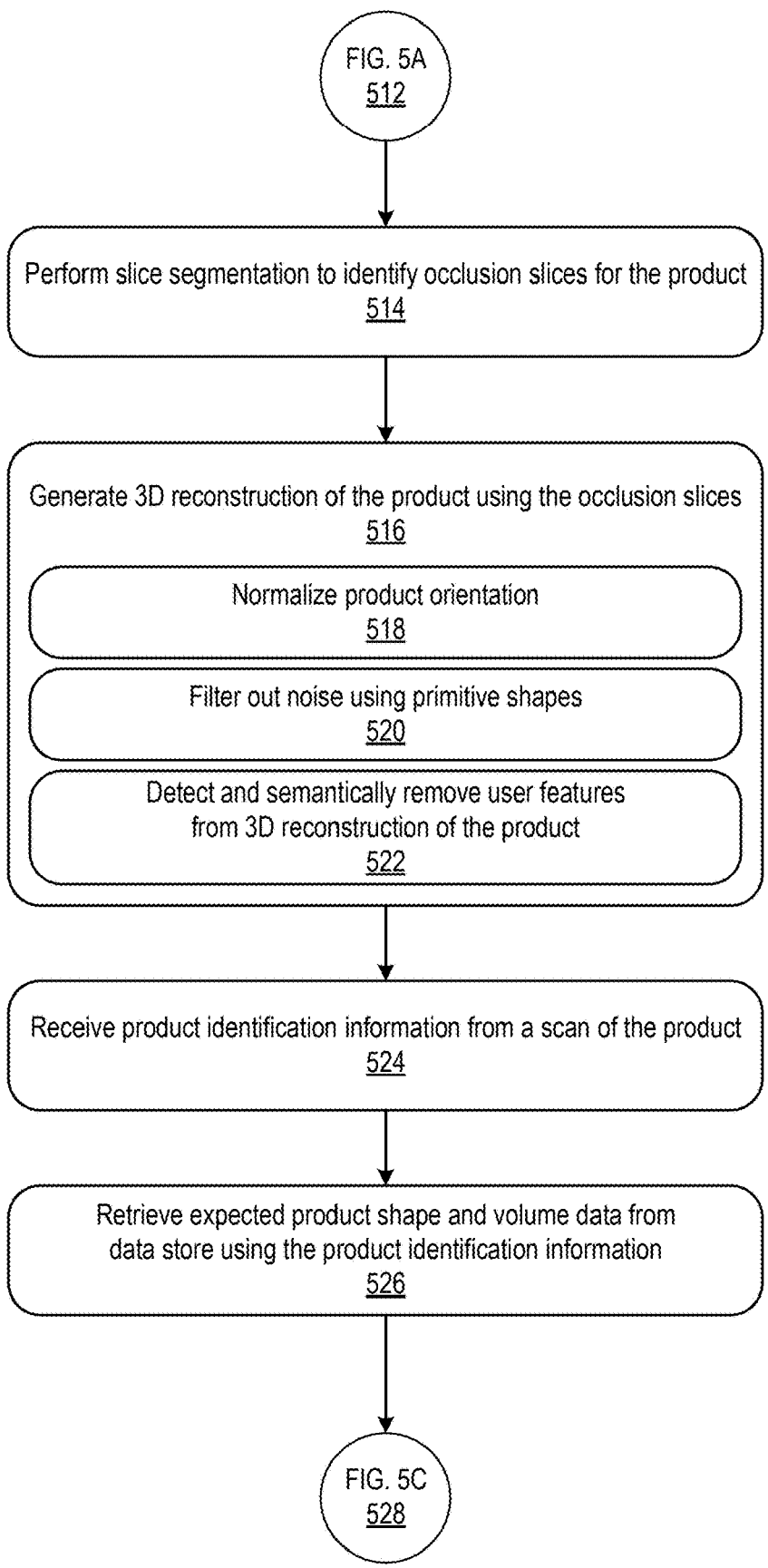
Figure 5C:
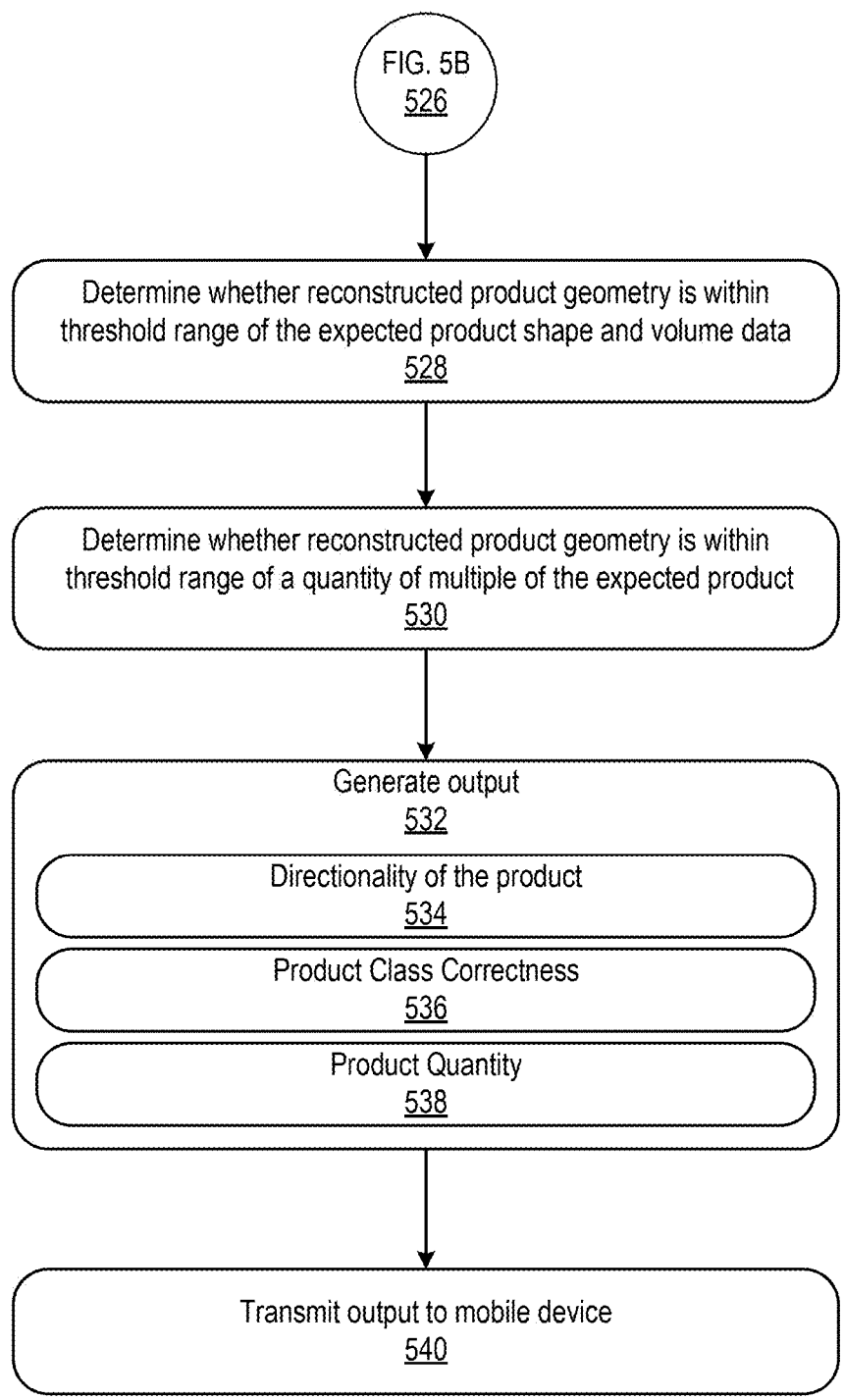

FIGS. 5A-C is a flowchart of a process 500 for validating a product that is added to a shopping cart. Although the process 500 is described from a perspective of adding a product to a cart, the process 500 can also be used to remove a product from the cart. The process 500 can be performed by one or more components described herein. For example, the process 500 can be performed by the controller 116 of the shopping cart 100 (e.g., refer to FIGS. 1-2). The process 500 or one or more blocks of the process 500 can also be performed by other components, such as the mobile device 112 or another computing system/device, cloud-based service, and/or network of computers/devices. For example, the process 500 can be performed by a central computing system of a particular retail environment or a central computing system of several retail environments in a network of retail environments. For illustrative purposes, the process 500 is described from the perspective of a controller.

Referring to the process 500 in FIGS. 5A-C, the controller can receive an indication that an IR beam was broken by a product moving into a cart (502). Thus, the controller can wait for an event to occur before beginning the process 500. In some implementations, as described throughout, the event can be a product scan at a guest's mobile device. In the example process 500, the event can be detection of the product being put into the cart. Here, the components of the cart operate in a low power and slow polling state. The controller can poll components of the cart's product validation hardware, such as IR sensors, at staggered, predetermined time intervals for indications of an IR beam being broken. The components can continue to operate in the lower power and slow polling state until an IR beam is detected as being broken. The IR sensors can detect occlusions of IR light across a top horizontal plane of the cart. As soon as a single point/portion of IR light is detected as being obstructed/broken off from detection by one or more of the IR sensors, the one or more IR sensors can notify the controller. The components of the cart can then be activated from the low power, slow polling state to a high power and fast polling state.

In the high power, fast polling state, the controller can activate an IR emitter of a plurality of IR emitters to generate IR data as the product moves into the cart in 504. Each of the plurality of IR emitters can be activated one at a time and in a clockwise direction around the top perimeter of the cart. Each IR emitter can be activated in succession in predetermined time intervals.

Each IR emitter, once activated, can emit IR light across the top horizontal plane of the cart while the product is moving through the top horizontal plane and into the cart. The product may block portions of the emitted IR light from being detected by IR sensors on an opposite side of the cart from the IR sensors. The IR sensors can collect IR data (e.g., intensity data) indicating high and low intensity signals. The high intensity signals can represent unobstructed IR light that is detected by the IR sensors while the low intensity signals can represent IR light that is obstructed by the product (e.g., refer to FIG. 2). In other words, the low intensity signals can indicate shadow(s) that are formed by the product blocking the light that is emitted from the activated IR emitter.

Activating one IR emitter at a time in a clockwise direction can be beneficial to perform an IR sweep and detect the product's geometry. Activating one IR emitter at a time can also be beneficial to reduce potential noise that may occur if multiple IR emitters are activated at one time. Furthermore, activating one IR emitter at a time can be beneficial to reduce power consumption and increase efficient user of compute resources.

In 506, the controller can receive the IR data from a plurality of IR sensors. As described above, IR sensors on an opposite side of the cart from where the IR emitter is activated can collect the IR data. In some implementations, all the IR sensors on the opposite side of the cart can be activated. In some implementations, a portion of all the IR sensors on the opposite side of the cart can be activated. The controller can receive the IR data in near real-time, as the light intensity signals are detected and collected by the IR sensors. The controller can receive all IR data that was collected at some predetermined time interval after the IR emitter is activated and/or before a next IR emitter is activated. In some implementations, the controller can receive IR data after multiple IR emitters have been activated. Thus, IR data can be transmitted in batches to the controller, which can reduce clogging of network bandwidth and efficiently utilize compute resources. The IR data can include light intensity signals detected by the IR sensors and timestamps at which the light intensity signals are detected.

In 508, the controller can determine (i) whether there are more IR emitters in the plurality of IR emitters to be activated or (ii) whether there is no longer an indication that the IR beam was broken. If not all of the IR emitters of the cart have not yet been activated, then the blocks 504-508 can be repeated until all IR emitters have been activated. Similarly, if one or more of the IR sensors still detect an obstruction of light along the top horizontal plane of the cart (e.g., the IR beam is broken), then the product is likely still moving into the cart (or moving out of the cart). The process 500 can return to blocks 504-508, which can be repeated until the IR beam is no longer broken. In repeating the blocks 504-508, the IR emitters can be individually activated, one at a time, at a constant rate (e.g., 5 mm) such that sufficient product geometry can be captured through the IR data as the product passes through the top horizontal plane of the cart.

If, in 508, there are no more IR emitters to be activated, the controller can determine that the IR sweep is complete and that the product has fully passed through the top horizontal plane of the cart. Similarly, if the IR sensors no longer detect an obstruction of light along the top horizontal plane of the cart, then the product is likely fully in the cart (or fully removed from the cart) and IR emitters may no longer be activated so that IR data can be collected. Instead, the components of the cart can return to a low power, slow polling state.

The controller can also receive product motion data from one or more optical flow sensors of the cart (510). The motion data can be received before, during, or after any of the blocks 504-508. For example, the motion data can be detected and received at a same time as the IR emitters are activated. The motion data can be received at predetermined time intervals that are coordinated with the activation of the IR emitters (and the IR sweep) to avoid noise in horizontal motion data. In some implementations, one or more of the optical flow sensors can automatically detect the motion data at predetermined time intervals and transmit the detected motion data to the controller. In some implementations, the optical flow sensors can be polled by the controller at a predetermined rate for the motion data. In yet some implementations, the motion data can be received in batches and/or once the IR sweep is completed in blocks 504-508. The motion data can include rotational data, movement direction rates, and/or position translations of the product as it passes through the top horizontal plane of the shopping cart.

The controller can then determine, in 512, a motion vector of the product as it moves into the cart. This determination can be based on the motion data and relative product and sensors position information. Such position information can be part of the motion data. The motion vector can include velocity/speed, rotation, path/directionality, and other movement information of the product as it moves into the cart. Due to variable distances that may occur between the one or more optical flow sensors and the product, the relative translation rate returned in the motion data may not directly translate into product velocity, which is used by the controller to generate occlusion slices for the product at regular time intervals. Trigonometric functions can therefore be performed by the controller and based on the relative product and IR optical flow sensors positions to determine the product's velocity as it enters the cart. The velocity can also be used to determine directionality of the product—whether the product is being added to the cart or whether the product is being removed from the cart. The controller can also generate a product position over time curve that can be used to track velocity of the product as it passes through the top horizontal plane of the cart. In other words, the curve can resemble a map of time values corresponding to a constant change in product position (e.g., 5 mm).

The controller can perform slice segmentation to identify occlusion slices for the product (514). The product position over time curve can be used to identify which received IR data should be used to generate occlusion slices of the product. Slice segmentation can continue to be performed until the controller has completed generating slices from all the IR data that was collected in blocks 504-508.

In some implementations, blocks 510-514 can be performed while the blocks 504-508 are being performed.

Once all the occlusion slices are determined for the product, the controller can generate a 3D reconstruction (e.g., model) of the product (516). The controller can stitch together or otherwise join all of the occlusion slices to generate the 3D representation of the product's rigid body structure. In some implementations, the product can be reconstructed in one or more other multidimensional spaces, such as 2D, 4D, 5D, etc. Moreover, the controller can use one or more machine learning trained models to generate the 3D reconstruction of the product, as described further in FIG. 3.

As part of generating the 3D reconstruction of the product, the controller can normalize the product orientation (518). The controller can adjust the 3D reconstruction of the product in a normalized orientation and within a standard coordinate plane. Normalization can be performed using one or more known techniques and/or algorithms. The controller can also apply one or more machine learning models that have been trained to normalize 3D reconstructions of products in 3D space or other multidimensional space.

The controller can also filter out noise using primitive shapes (520). For example, the controller can use a set of primitive shapes (e.g., boxes, cylinders, spheres, etc.) to bias and constrain the 3D reconstruction of the product. The controller may apply one or more machine learning models that were trained to select which shapes to use to further refine the 3D reconstruction of the product. For example, the machine learning model can detect that the 3D reconstruction of the product is relatively a rectangular shape. The machine learning model may therefore select a rectangle or other box-shape to apply to the 3D reconstruction of the product. Using the rectangle or other box-shape, the machine learning model can filter out or otherwise remove anomalies in the 3D reconstruction that may not be part of the product. The machine learning model can be trained with training data sets having (i) 3D reconstructions of different products of varying shapes and (ii) 3D reconstructions of the different products with the appropriate primitive shapes selected and applied thereto. Both (i) and (ii) can be fed into the machine learning model as input and used to train and validate the model to identify which primitive shapes to apply to which product shapes and thus filter out any noise. In some implementations, the controller can use one or more algorithms or other techniques to apply the set of primitive shapes to the 3D reconstruction of the product and filter out any noise in 520.

The controller can also detect and semantically remove user features from the 3D reconstruction of the product (522). In some implementations, the controller can apply one or more machine learning models that were trained to identify body parts and remove such body parts from products constructed in 3D space. By applying the machine learning model(s), the controller can identify whether a guest's hands or other body parts appear in the 3D reconstruction of the product. If the hands or other body parts are detected, such hands or other body parts can be semantically removed.

The controller can receive product identification information from a scan of the product in 524. The product identification information can be a unique product identifier, such as a barcode, UPC, SKU, or other uniquely identifying value. As described throughout this disclosure, block 524 can be performed before and/or during any of the blocks 502-522. For example, the process 500 can be triggered by or otherwise begin with a product scan at the mobile device. After all, a guest can scan the product with their mobile device before putting the product inside their shopping cart. Once and/or at a same/similar time as when the product is scanned, the product validation hardware can detect an IR beam being broken (502). Therefore, 524 can occur at or around a same time as 502. As another example, once the product is scanned, the product validation hardware can be activated (504) without having to wait for an indication that an IR beam was broken (502).

The controller can retrieve expected product shape and volume data from a data store using the product identification information in 526. 526 can also be performed before, during, and/or after any one or more of 502-522, as described above in reference to 524. Thus, the controller can request product information from the data store that is associated with the product identification information. The product information can include shape and volume data associated with the scanned product. Such information can be used by the controller to determine whether the 3D reconstruction of the product matches or is similar to the scanned product. If they do not match or are not similar, then the product that was added to the cart is likely not the same as the scanned product. The guest might have scanned a product they did not intend to purchase and placed a different product in their cart. The guest might have also engaged in suspicious activity, such as ticket switching, and intended to scan a product they did not intend to purchase but placed a different product in their cart.

As mentioned above, block 526 can also be performed before or during any of the blocks 502-522. In some implementations, the mobile device that performed the scan can ping the data store for product information associated with the product identification information. The data store can then transmit the product information to the controller. In some implementations, the mobile device can retrieve the product information from the data store then transmit that information to the controller.

In 528, the controller can determine whether the reconstructed product geometry is within a threshold range of the expected product shape and volume data. In so doing, the controller can validate (e.g., verify) the product added to the cart. If the reconstructed product geometry is within the threshold range, then it likely matches the product that was scanned by the guest's mobile device. The controller can therefore determine that the product class (e.g., classification, category) is correct. In other words, the controller can determine that the product added to the cart likely is the same type of product as the scanned product. For example, the scanned product can be a box of a particular type of rice. The 3D reconstruction of the product can be a similarly shaped box. The 3D reconstruction of the product can fall within the threshold range of shape and volume for the particular type of rice box identified from the product identification information. Thus, the controller can validate that the product added to the cart is a rice box, even if the controller may not positively identify the product added to the cart as the particular type of rice of the scanned product. Validating the product class can be sufficient to determine that the guest added the right product to their transaction and is paying the appropriate price for that product.

Validating the product therefore includes confirming what product is added to the guest transaction. When products are validated, the guest's transaction can be completed remotely, at the mobile device, instead of having to wait in line to complete the transaction at a checkout lane/station. Thus, the guest can simply leave the retail environment with the product(s) in their cart without having to go through a traditional retail checkout process. This can improve the guest shopping experience and provide for faster, more efficient transaction completion.

If the reconstructed product geometry is not within the threshold range of the expected shape and volume data in 528, then it likely does not match the product that was scanned by the guest's mobile device. Thus, the product cannot be validated and the guest cannot complete the transaction at their mobile device. The controller can determine that the product class is incorrect. In the above example, if the scanned product was a box of rice and the 3D reconstruction of the product resembles the shape of a gallon milk carton, the 3D reconstruction of the product may not be within the threshold range of the expected shape and volume of the box of rice. Therefore, the controller can determine that the milk carton added to the cart is not a same category or class of products as the box of rice and the guest added the wrong product to their cart. The milk carton will not be validated and the guest may not be able to complete the transaction.

In 530, the controller can determine whether the reconstructed product geometry is within a threshold range of a quantity of multiple of the expected product. For example, if the guest scanned 3 boxes of rice with their mobile device, the controller can determine whether the 3D reconstruction of the product is a similar shape and/or volume of 3 boxes of rice in combination. If the 3D reconstruction of the product is sufficiently close (e.g., within the predetermined threshold range) to a multiple of the expected product, then the controller can validate the product(s) added to the cart.

The controller can generate output based on the determinations made in blocks 528-530. In some implementations, the controller can generate output about a directionality of the product in 534. Directionality can be determined based on the velocity (e.g., refer to 512). If the controller determines that the product is being added to the cart, the controller can verify that the guest's transaction is updated to reflect addition of the product to the transaction. If, on the other hand, the product is being removed from the cart, the controller can verify that the guest's transaction is updated to reflect removal of the product from the transaction. By confirming directionality of the product, the controller can validate and update the guest's transaction such that the transaction can be completed remotely at the mobile device instead of at a traditional checkout lane/station. The controller can therefore generate output confirming that the product was added or removed from the cart. If the controller cannot confirm that the product was added or removed from the cart, the controller can generate a notification or other message to that effect to be presented to the guest.

The controller can generate output about a product class correctness in 536. For example, the controller can generate a message confirming that the guest placed a product in the cart that matches or is similar to the product that the guest scanned. As another example, the controller may not generate a message unless the product class is incorrect. Thus, the controller can generate a message indicating that the product added to the cart does not match the product that was scanned. The guest may, for example, be prompted to rescan the product or put the correct product in the shopping cart. The guest may, for example, be prevented from scanning additional products until the current product can be validated. In some implementations, a retail employee, such as in-store security personnel, can also be notified that the guest's product(s) could not be validated. The retail employee may approach the guest and help them scan the correct product with their mobile device. The retail employee may also monitor the guest to determine whether the guest continues with the scanning process and/or scans the correct product(s). In some implementations, the retail employee may decide whether to intervene before the guest leaves the retail environment. For example, the retail environment can perform a bag/cart check to determine whether the guest is leaving the retail environment with the product (s) they actually paid for.

Furthermore, in some implementations, generating output about product class correctness in 536 can include determining a confidence value for validating a product and/or all products that have been added to the shopping cart. For example, if the reconstructed product geometry is within a correct margin of error of the expected product, then the controller can determine a high confidence value that the product is validated. If the reconstructed product geometry is not within the correct margin of error but is still within some threshold range of the correct margin of error, then the controller can determine to wait before generating a notification that prompts a retail employee to review the shopping cart while the guest is in the retail environment. The controller can wait until a threshold quantity of products added to the cart are not validated. If, on the other hand, the reconstructed product geometry is outside the correct margin of error by a significant amount, then the controller can determine a low confidence value about the product validation (in other words, the product may not be validated). If the confidence value is within some low threshold range, the controller can generate a notification prompting a retail employee or other relevant user to check the shopping cart before the guest leaves the retail environment.

As mentioned above, the controller can also determine an overall confidence value for product validations of the shopping cart in 536. The controller can tally or count how many products in the shopping cart were validated and how many products in the shopping cart were not validated. If the quantity of products that were not validated exceeds some threshold value or range, the controller can generate a notification that prompts a retail employee or other relevant user to check the shopping cart. The controller can also aggregate (e.g., sum) the confidence values for all the products in the shopping cart and determine an aggregate confidence value. If, for example, the aggregate confidence value is less than some threshold range (meaning the controller has low confidence that the products in the cart are validated), the controller can generate a notification for the guest and/or a retail employee to check the shopping cart before the guest leaves the retail environment.

The controller can also generate output about product quantity correctness in 538. For example, the controller can generate a notification indicating to the guest that a correct quantity of product was added to the guest's cart and their transaction. The controller can also generate a notification indicating to the guest that an incorrect quantity of product was added to the guest's cart. The notification can, in some implementations, prompt the guest to add the correct quantity of the product to their cart. One or more other outputs can be generated by the controller.

Finally, the controller can transmit the output to a mobile device in 540. As described herein, the mobile device can be a guest's computing device that the guest uses to scan products in the retail environment. In some implementations, where the controller generates output for the retail employee(s) or other relevant users, the mobile device can be a computing device of such users and not the mobile device used by the guest to scan the products that the guest intends to purchase.

Although described from the perspective of a product being added to the cart, the process 500 can also apply to products that are removed from the cart. For example, the controller can receive an indication that an IR beam was broken, the product validation hardware can be activated to generate IR data as the product is being removed from the cart, the controller can determine velocity and movement of the product in a direction that resembles the product being removed from the cart, the controller can generate occlusion slices and use those slices to reconstruct the product in 3D space, and the controller can determine whether the reconstructed product matches or is similar to information about a product that the guest removes from their transaction (and/or virtual shopping cart) at the mobile device. Thus, the controller can validate the product that was removed from the transaction such that the transaction can be completed remotely at the mobile device instead of at a traditional checkout lane/station.

Figure 6:
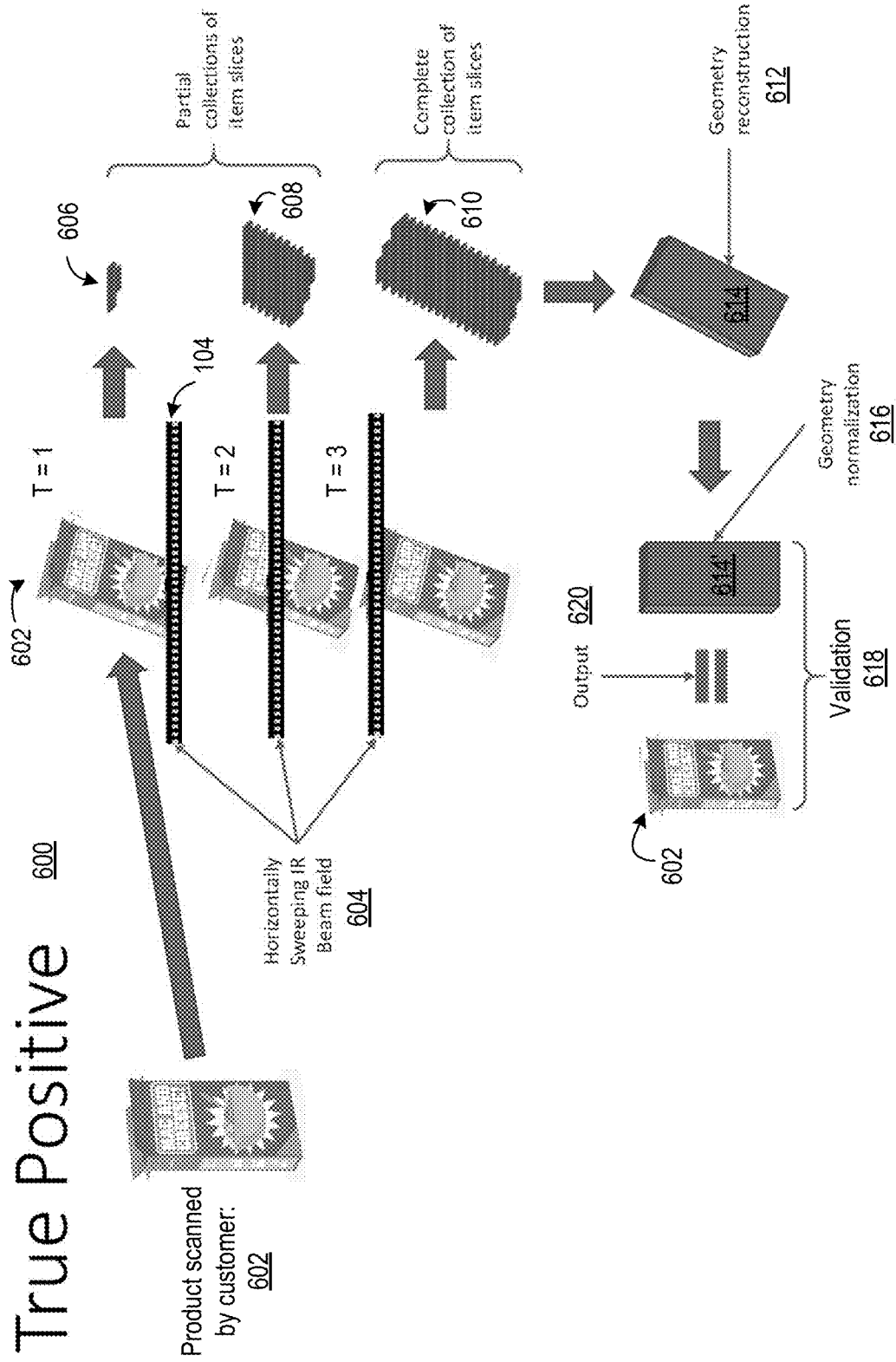
FIG. 6 depicts an example true positive determination made for a product that is added to a shopping cart using the disclosed techniques.

FIG. 6 depicts an example true positive determination 600 made for a product 602 that is added to a shopping cart using the disclosed techniques. A guest can scan an identifier, such as a barcode, on the product 602 with their mobile device. The product 602 in FIG. 6 is a box of Mac n Cheese. Once the product 602 is scanned (or an IR beam is detected as being broken by the product 602 moving into the cart), the product validation hardware 104 of the shopping cart can be activated. Thus, an IR sweep can be performed at the top horizontal plane of the cart (604) as described throughout this disclosure.

At T=1, for example, only a small portion of the product 602 may be breaking the IR beam field (e.g., a bottom corner of the Mac n Cheese box). The IR data collected by the product validation hardware 104 at T=1 can be used to generate some slices 606 of the product 602.

At T=2, approximately half of the product 602 has passed through the IR beam field at the top horizontal plane of the shopping cart. The IR data collected by the product validation hardware 104 at T=2 can be used to generate more slices 608 of the product 602.

At T=3, approximately all of the product 602 has passed through the IR beam field. The IR data collected by the product validation hardware 104 at T=3 can be used to generate remaining slices 610 of the product 602. At this time point, all the slices (e.g., occlusion slices described throughout this disclosure) needed to reconstruct the product 602 can be generated, collected, and/or stored.

Next, geometry reconstruction 612 can be performed to reconstruct the product 602 in 3D space. As shown in FIG. 6, the complete collection of product slices 610 can be constrained/bounded within a primitive shape, a rectangle, to generate reconstructed product 614. The reconstructed product 614 can also be generated in the same orientation that the product 602 was detected moving into the cart.

Geometry normalization 616 can be performed to normalize orientation of the reconstructed product 614 in a standard coordinate system. Normalization 616 can make comparison of the reconstructed product 614 to expected product shape and volume data more accurate and efficient than if the reconstructed product 614 is not normalized. Normalization 616 can result in the normalized reconstructed product 614'. In some implementations, where guest hands or other body parts are part of the reconstructed product 614, they can be semantically removed to generate the normalized reconstructed product 614', as described throughout this disclosure.

Next, a validation process 618 can be performed to determine whether the reconstructed product 614' matches or is similar to the product 602, which is identified by the product scan performed by the guest. The validation process 618 can include comparing shape and volume of the reconstructed product 614' to expected shape and volume data associated with the product 602. The validation process 618 can include determining a correct class, quantity, and directionality of the reconstructed product 614' that is added to the cart and the guest's transaction. For quantity correctness, any axis being within a predetermined percent of an even multiple of the product 602's dimensions (e.g., shape and volume data) can be tolerated.

In FIG. 6, output 620 can indicate that the reconstructed product 614' is validated. In other words, the reconstructed product 614' can be sufficiently close in size, volume, and shape (e.g., dimensions) to the product 602. The reconstructed product 614' can also be sufficiently close in quantity as expected for the product 602. The product 602 is a box of Mac n Cheese and the reconstructed product 614's resembles that product. Thus, the reconstructed product 614' can be validated as the true positive determination 600. This means that the guest's transaction accurately reflects what product is added to the cart. The guest can continue to scan and add products to their cart. The guest can also complete the transaction at the guest's mobile device instead of waiting in line to complete the transaction at a checkout lane/station.

Figure 7:
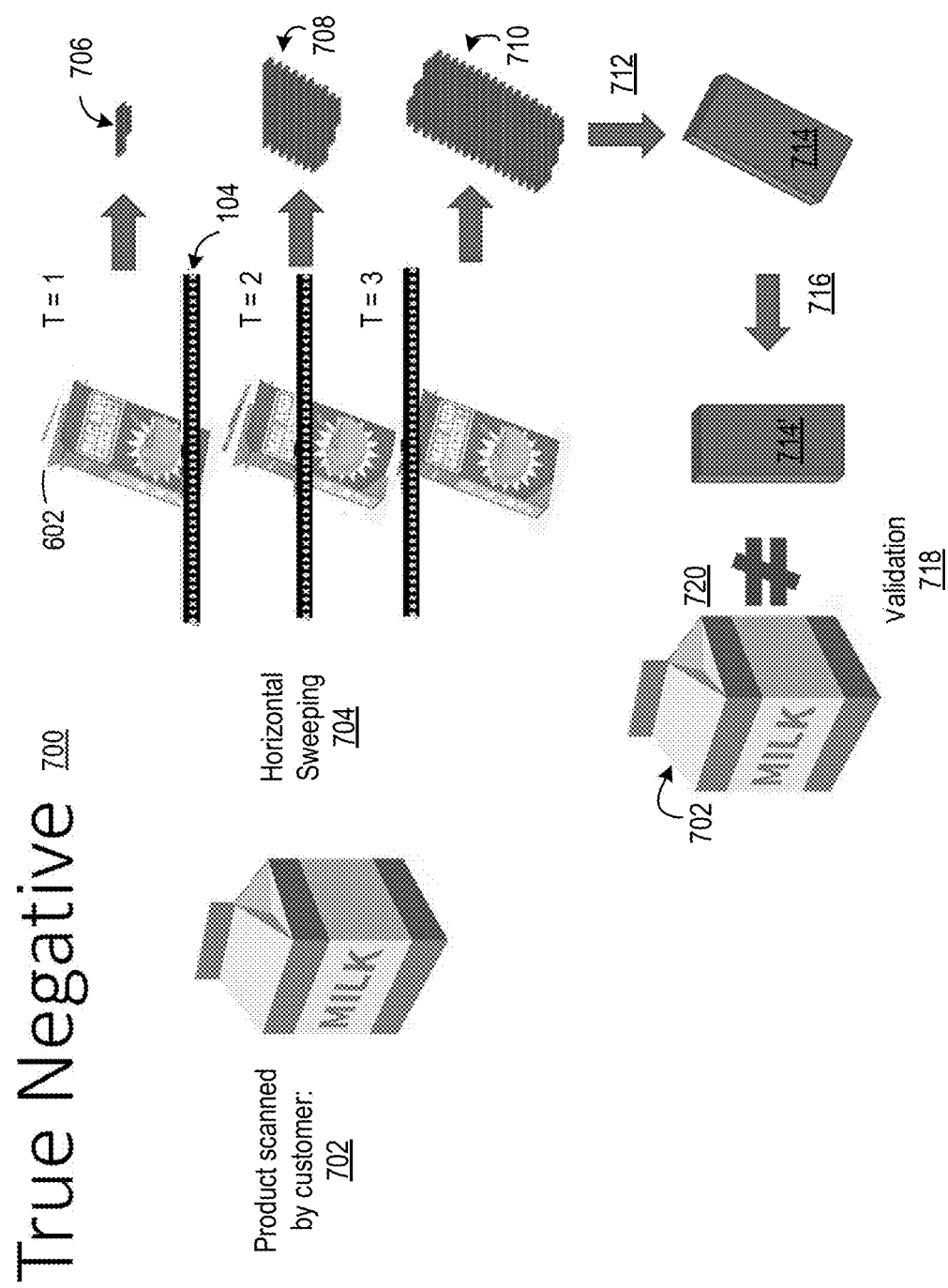
FIG. 7 depicts an example true negative determination made for a product that is added to a shopping cart using the disclosed techniques.

FIG. 7 depicts an example true negative determination 700 made for a product that is added to a shopping cart using the disclosed techniques. Here, the guest scanned an identifier for a milk carton 702 but attempted to put the Mac n Cheese box 602 in the cart. This would trigger a product match failure event and prompt the guest to scan the box 602 or remove the box 602 from the cart and put the milk carton 702 in the cart.

Once the product 702 is scanned (or an IR beam is detected as being broken by the product 602 moving into the cart), the product validation hardware 104 of the shopping cart can be activated. Thus, an IR sweep can be performed at the top horizontal plane of the cart (704) as described throughout this disclosure. As shown here, the product 602 entering the cart is not the same as the product 702 that was scanned by the guest.

At T=1, for example, only a small portion of the product 602 may be breaking the IR beam field (e.g., a bottom corner of the Mac n Cheese box). The IR data collected by the product validation hardware 104 at T=1 can be used to generate some slices 706 of the product 602.

At T=2, approximately half of the product 602 has passed through the IR beam field at the top horizontal plane of the shopping cart. The IR data collected by the product validation hardware 104 at T=2 can be used to generate more slices 708 of the product 602.

At T=3, approximately all of the product 602 has passed through the IR beam field. The IR data collected by the product validation hardware 104 at T=3 can be used to generate remaining slices 710 of the product 602. At this time point, all the slices (e.g., occlusion slices described throughout this disclosure) needed to reconstruct the product 602 can be generated, collected, and/or stored.

Next, geometry reconstruction 712 can be performed to reconstruct the product 602 in 3D space. As shown in FIG. 6, the complete collection of product slices 710 can be constrained/bounded within a primitive shape, a rectangle, to generate reconstructed product 714. The reconstructed product 714 can also be generated in the same orientation that the product 602 was detected moving into the cart.

Geometry normalization 716 can be performed to normalize orientation of the reconstructed product 714 in a standard coordinate system. Normalization 716 can make comparison of the reconstructed product 714 to expected product shape and volume data for the scanned product 702 more accurate and efficient than if the reconstructed product 714 is not normalized. Normalization 716 can result in the normalized reconstructed product 714'. In some implementations, where guest hands or other body parts are part of the reconstructed product 714, they can be semantically removed to generate the normalized reconstructed product 714', as described throughout this disclosure.

Next, a validation process 718 can be performed to determine whether the reconstructed product 714' matches or is similar to the scanned product 702, which is identified by the product scan performed by the guest. The validation process 718 can include comparing shape and volume of the reconstructed product 714' to expected shape and volume data associated with the scanned product 702. The validation process 718 can include determining a correct class, quantity, and directionality of the reconstructed product 714' that is added to the cart and the guest's transaction. For quantity correctness, any axis being within a predetermined percent of an even multiple of the product 702's dimensions (e.g., shape and volume data) can be tolerated.

In FIG. 7, output 720 can indicate that the reconstructed product 714' is not validated. In other words, the reconstructed product 714' is not sufficiently close in size, volume, and shape (e.g., dimensions) to the scanned product 702. The scanned product 702 is a milk carton while the reconstructed product 714' resembles a box of Mac n Cheese. Since the reconstructed product 714' is so different from the scanned product 702, a true negative determination 700 can be made. Since the reconstructed product 714' is not validated, the guest can be prompted with a notification to rescan the correct product (e.g., the Mac n Cheese box 602) and/or put the milk carton 702 in the cart and remove the Mac n Cheese box 602 from the cart. As described herein, the guest may not be permitted to continue scanning products or complete the transaction until the guest corrects the mismatch that was identified in FIG. 7.

The techniques described above can be implemented and applied by various devices in a variety of scenarios. For example, in some implementations, a mobile device of a guest (e.g., smartphone) can be used to scan a product, a controller of a shopping cart can be configured to validate the product, and the mobile device can track contents of a virtual shopping cart for the guest, the virtual shopping cart including products that are scanned and added to the physical shopping cart. In some implementations, the mobile device can scan the product, the controller of the shopping cart can validate the product, and a cloud based computing system can keep track of the virtual shopping cart. In some implementations, the mobile device can scan the product, validate the product, and track the virtual shopping cart. In yet some implementations, the shopping cart can include a barcode scanner or other type of scanning device to scan the product, the controller of the cart can validate the product, and the mobile device or the controller of the shopping cart can track the virtual cart. In some implementations, the scanning device of the shopping cart can scan the product and the mobile device can validate the product and track the virtual shopping cart. In yet some implementations, the scanning device of the shopping cart can scan and validate the product while the cloud computing system can track the virtual shopping cart. This implementation can be preferred in scenarios in which processing is offloaded from the mobile device. The mobile device may be paired to the shopping cart and used to complete a purchase, however scanning, validating, and/or tracking processing may not occur at the mobile device. The mobile device may, for example, have insufficient processing power, low network connectivity, and/or low enough battery that processing at the mobile device may drain the battery.

Figure 8:
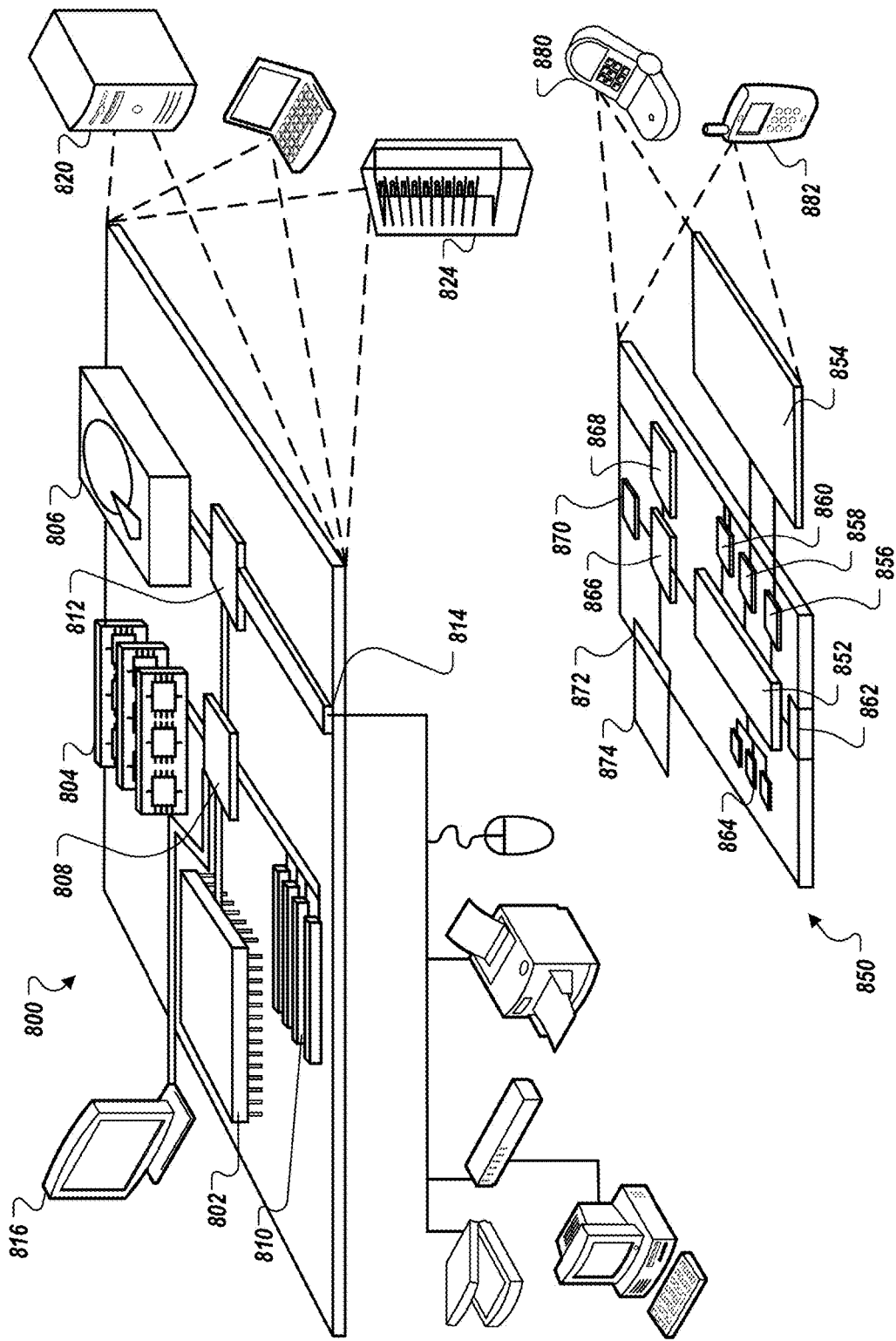
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 9:
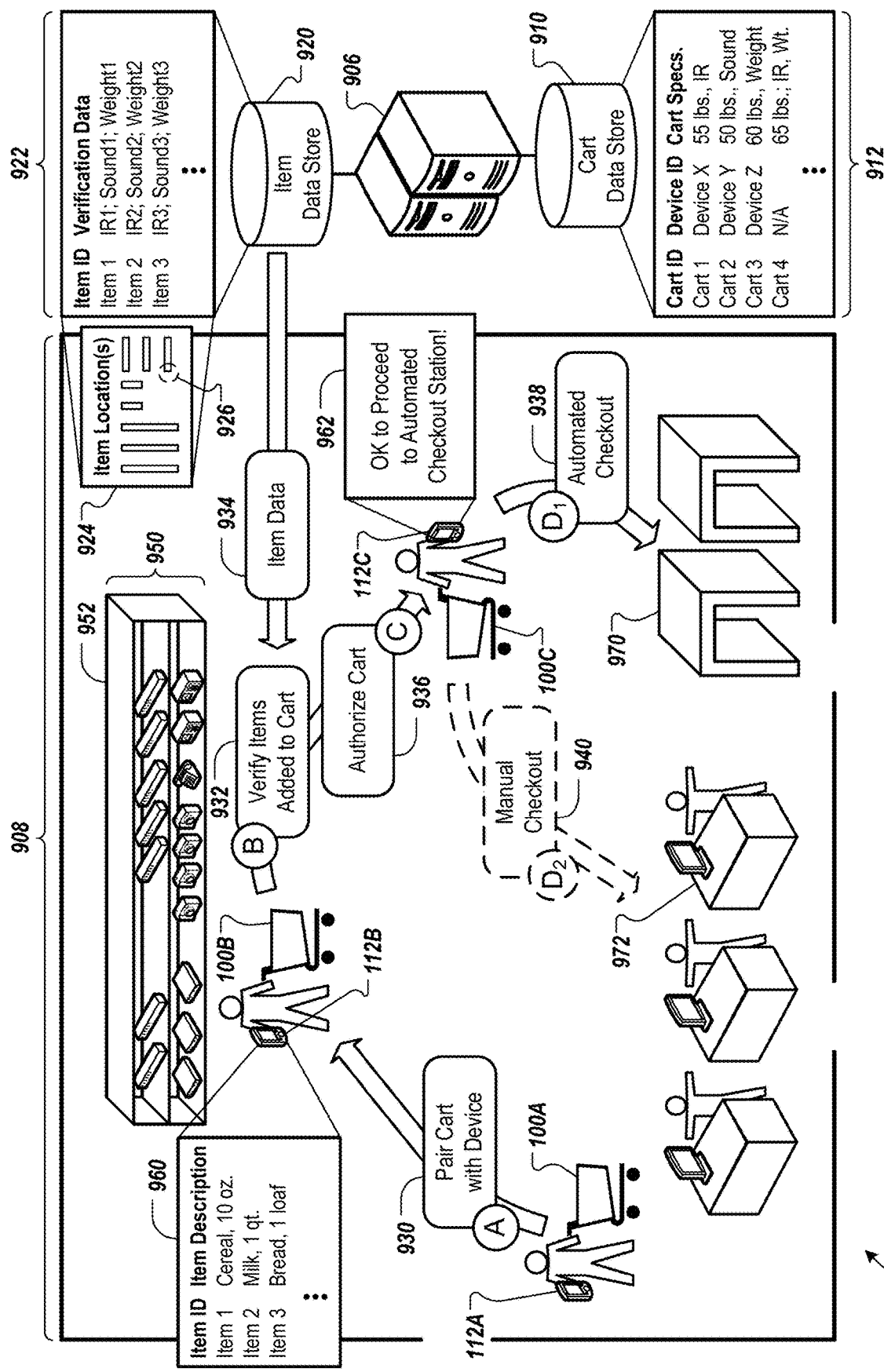
FIG. 9 is a conceptual drawing of an example retail environment, and an example system for verifying items placed in physical shopping carts.

FIG. 9 is a conceptual drawing of an example shopping environment 908, and an example system 900 for verifying items placed in physical shopping carts, as represented in example stages (A) to (D). Stages (A) to (D), for example, may occur in the illustrated sequence, a different sequence, and/or two or more stages (A) to (D) may be concurrent. In some examples, one or more stages (A) to (D) may be repeated multiple times during a shopping trip.

The shopping environment 908 can be a physical retail store, warehouse, or another sort of facility in which various items 950 (e.g., physical products) are stored in various storage units 152 (e.g., shelves, racks, bins, etc.) and are available for selection by various system users (e.g., customers, employees, or other system users). In general, each system user can employ a respective personal mobile device and a respective shopping cart while traversing the shopping environment 908 and adding items to their cart. In the present example, a system user employs mobile device 102 (e.g., a smart phone, a digital assistant, a tablet, or another sort of mobile computing device) and shopping cart 104 (e.g., a smart cart, a dolly cart, a shopping basket, or another sort of manually operated or self-guided physical device for conveying items, that includes various computing components and physical sensors) while shopping. The mobile device 102, for example, can communicate with the shopping cart 104 and with a server system 106 during the user's shopping trip. The server system 106, for example, can include and/or communicate with one or more computing servers (e.g., application servers, cloud servers, data servers, etc.). As described in further detail in examples below, communication between the various devices and systems may occur over a communication network and/or may occur over a direct connection.

During stage (A), a shopping cart is paired with a user's mobile computing device. For example, the system 900 can perform operation 130, pairing shopping cart 104 (shown here as cart 104a) with mobile device 102 (shown here as device 102a). Pairing the cart 104 with the mobile device 102, for example, can be initiated when the device 102 detects an identifier of the cart 104, which can be performed by the device 102 in a variety of ways. For example, the user of the mobile device 102 can select an option to scan a cart identifier (e.g., a barcode, a QR code, etc.) on the cart 104, using a mobile application running on the device 102, and can then capture an image of the cart identifier (e.g., using a device camera). As another example, the user of the mobile device 102 can select an option to wirelessly obtain the cart identifier, using the mobile application, and can then follow instructions presented by the mobile application regarding how to position the device 102 relative to the cart 104 to obtain the cart identifier wirelessly. In some implementations, wirelessly obtaining a cart identifier by a mobile computing device can include establishing a local wireless network between the device (e.g., mobile device 102) and a cart (e.g., cart 104). The local network, for example, can be any of a variety of communication networks between the mobile device 102 and the shopping cart 104, such as a WiFi Direct connection, a BLUETOOTH pairing (e.g., BLE pairing), an NFC connection, and/or connections to a common local wireless network (e.g., both the mobile device 102 and the cart 104 being connected to the same WiFi network). Other options for obtaining the cart identifier by the mobile device 102 are also possible. For example, the cart identifier can be obtained by establishing a wired connection between the mobile device 102 and the cart 104 (e.g., a tethered connection, such as a wired USB connection).

Once the cart identifier has been obtained, the mobile device 102 can transmit a cart association request to the server system 106 (e.g., through a WiFi network, or another suitable network of the retail environment 908). The cart association request, for example, can include the obtained cart identifier of the shopping cart 104, and can include information that uniquely identifies the mobile device 102. In response to receiving the cart association request, for example, the server system 106 can update cart data 112 in a cart data store 110 (e.g., a data server, a file system, or another suitable type of data storage device or system) to include data that associates the shopping cart 104 with the mobile device 102. In the present example, the cart data store 110 can include additional shopping cart specifications, such as a weight of a cart, and types of item verification sensors that may exist on the cart (e.g., infrared (IR) sensors, sound sensors, weight sensors, cameras, or other suitable sensors). Such additional information can be used by the system 900 to facilitate verification of items being added to the shopping carts and/or a final verification of cart contents, as described in further examples below.

During stage (B), items added to a shopping cart are verified. For example, the system 900 can perform operation 132, in which operations of the mobile device 102 (shown here as device 102b), the shopping cart 104 (shown here as cart 104b), and the server system 106 are coordinated to verify one or more items 950 as the items are added to the cart 100. A user can select one or more of the items 950 from its storage unit 952, for example, and can scan the item(s) with the mobile device 112, using a mobile application (e.g., a shopping application) running on the device 112. Item scanning, for example, can be performed by capturing an image of an identifier of a selected item (e.g., a barcode, a QR code, etc.) using a camera of the mobile device 112, by scanning a Radio Frequency Identification (RFID) tag of the selected item using an RFID scanner of the mobile device 112, or by performing another sort of item scan.

Once the item identifier has been obtained (and optionally, once an item quantity has been specified by the user), the mobile device 112 can transmit an item data request to the server system 106 (e.g., through a WiFi network, or another suitable network of the retail environment 908). The item data request, for example, can include the obtained item identifier of a selected item 950. In response to receiving the item data request, for example, A server system 906 can access an item data store 920 (e.g., a data server, a file system, or another suitable type of data storage device or system) that can include, in association with unique identifiers for various types of items (e.g., products in the retail environment 908), item data 922 for the items. The item data 922, for example, can include various types of item verification data for each item, each type of item verification data corresponding to a different type of item verification sensor that may exist on a shopping cart (e.g., infrared (IR) sensors, sound sensors, weight sensors, cameras, or other suitable sensors). In addition to the item verification data, for example, the item data 922 can include other item data in association with an item identifier, such as an item price, an item description, an item weight, an image of the item, one or more known locations of the item in the retail environment 908 according to a planogram and/or a heat map, etc. In the present example, the server system retrieves and provides item data 934 (e.g., including some or all of the item verification data and other item data that pertains to the selected item 950) to the mobile device 112 and/or the shopping cart 100, from the item data store 920.

In some implementations, retrieving and providing item verification data can be based at least in part on shopping cart specifications of a shopping cart that is paired with a mobile device that requested the data. For example, the item data request can include, along with the obtained item identifier of the selected item 950, an identifier of the shopping cart 100 that is paired with the mobile device 112, and/or an identifier of the device 112. Upon receiving the identifier of the shopping cart 100 and/or the identifier of the device 112, for example, the server system 906 can access a cart data store 910 and retrieve (and optionally, cache for later use) shopping cart specifications that correspond to the shopping cart 100. As another option, the mobile device 112 can provide the server system 906 with the shopping cart specifications that correspond to the paired shopping cart 100 as part of the item data request. After receiving the shopping cart specifications for the shopping cart 100 (e.g., including data that indicates each type of sensor that exists on the cart), for example, the server system 906 can retrieve and provide item verification data that corresponds to the selected item 950 and to the types of item verification sensors that exist on the cart 100. By retrieving and providing verification data that pertains to a particular cart, for example, an amount of data transmitted over the network(s) can be reduced, along with data transmission times.

In some implementations, retrieving and providing item verification data (and optionally, other item data) for an item can be performed without the item having been scanned. For example, the mobile device 112 can be associated with a user account that has a historical purchase history maintained by the server system 906. When the mobile device 112 and the shopping cart 100 are paired, for example, the server system 906 can retrieve and provide item verification data (and optionally, other item data) that pertains to a subset of the items 950 that have been frequently purchased by the user, based on the historical purchase history associated with the user's account. As another example, as the mobile device 112 moves throughout the retail environment 908, device location information (e.g., based on wireless signal strength data, Global Positioning System (GPS) data, or other suitable data) can be provided to the server system 906. In response to receiving the device location information, for example, the server system 906 can retrieve and provide item verification data (and optionally, other information) that pertains to a subset of the items 950 that are in proximity to the mobile device 112 (e.g., based on item location information maintained in the item data store 920).

By using the server system 906 to retrieve and provide verification data (and optionally, other item data) as the data is used (and/or, in anticipation of the data being used), data updates can be centrally managed. For example, the retail environment 908 may include tens of thousands of different types of items 950, and the relevant verification data and other product information for such items can change over time. When changes occur, for example, the item data store 920 and/or the cart data store 910 can be updated, and the mobile device 112 and/or the shopping cart 100 can receive current data for particular items upon request. Thus, the data storage requirements of both the mobile device 112 and the shopping cart 100 can be reduced, along with an amount of data transmitted over the network(s).

Once the item data 934 has been retrieved and provided by the server system 906, for example, the mobile device 112 and/or the shopping cart 100 can receive the data 934, and can use the data 934 to verify whether the item 950 scanned by the mobile device 112 is actually added to the cart 100, according to item verification sensors of the cart 100. In general, item verification data of a particular type can be used by item verification sensors of a corresponding type to verify an item. For example, infrared (IR) verification data (e.g., data that defines a size/shape of an item, as detected by IR sensors when the item enters the cart 100) can be used to verify the item 950 according to the shopping cart's IR sensors, as described throughout this disclosure. As another example, sound verification data (e.g., data that defines a sound that the item produces when placed in the cart 100, as detected by sound sensors) can be used to verify the item 950 according to the cart's sound sensors (e.g., one or more microphones). Example techniques for performing product validation based on sound verification data are described in Application No. 63/276,462, entitled SHOPPING CART WITH SOUND-BASED VALIDATION, which is herein incorporated by reference. As another example, weight verification data (e.g., data that defines a weight bump that the item generates when placed in the cart 100, as detected by weight sensors) can be used to verify the item 950 according to the cart's weight sensors (e.g., one or more scales). Example techniques for performing weight bump validation are described in Application No. 63/276,474, entitled SHOPPING CART WITH WEIGHT BUMP VALIDATION, which is herein incorporated by reference. Other types of item verification data and corresponding sensors are possible, and the various sensor types can be used singly or in combination with other sensors (and optionally, in combination with item location data) to verify scanned items. Item verification can include determining whether item verification data for a scanned item matches data collected by the corresponding sensors, as described in further detail in examples below.

In some implementations, item location data can be used to verify an item. For example, the item data 934 can include item location data 924 (e.g., including one or more item locations 926 according to a planogram and/or a heat map of past item scans by other mobile device users) for the item 950. As items are scanned by multiple different users in the retail environment 908, potentially through the use of multiple different applications (e.g., customers using a shopping application, employees using an inventory application, etc.), location data for each item scan can be determined (e.g., based on wireless signal strength data, Global Positioning System (GPS) data, or other suitable location data provided through use of a scanning device) and can be stored (e.g., by the item data store 920) for use in aggregating and providing the item location data 924. In general, location data for an item that has been collected within a certain period of time (e.g., the past day, the past week, the past month, or another suitable period of time) can be used for aggregating and providing item location data. If an item becomes available at a new location, for example, the new location can eventually be recognized as a valid location for the item, as the item is scanned at the new location by multiple different users over time. Item verification can include determining whether a location of a current scan of an item matches a determined item location 926 for the item according to its item location data 924 (e.g., the current scan location is within a threshold distance of five feet, 10 feet, 20 feet, or another suitable threshold distance of the determined item location). When the location of the current item scan matches the determined item location 926 according to its item location data 924, for example, the scanned item can be verified with a higher level of confidence, whereas the scanned item may be unverified (or verified with a lower level of confidence) when the location of the current item scan does not match the determined item location. By considering the location of a current item scan relative to a determined item location according to its item location data when verifying an item, for example, deceptive practices (e.g., switching a high-cost item with a low-cost item having a similar physical profile) can be potentially be detected and prevented.

In some implementations, once an item has been successfully or unsuccessfully verified, a user can be notified through output generated by the mobile device 112 and/or the shopping cart 100. In the present example, the mobile device 112 (shown here as device 112b) can add the selected item (e.g., one of items 950) to a virtual shopping cart maintained by the device 112 and/or servers 906, which can be presented to the user at interface 960. As another example, the shopping cart 100 can provide an indication (e.g., visual, sonic, and/or tactile) of successful and/or unsuccessful item verification. Additional user notifications and interfaces are described in further detail in examples below.

In some implementations, a user may not be notified of an item being successfully or unsuccessfully verified. For example, item verification results can be maintained in association with a virtual shopping cart (e.g., with a scanned item being added to the cart, along with its verification status), without providing the item verification results to the user. By maintaining item verification results in the background in association with the user's virtual shopping cart, for example, a relatively uninterrupted shopping experience can be facilitated, while tracking the verification statuses of items that have been added to the cart. The verification statuses of each item in the virtual shopping cart can be aggregated, possibly with one or more other factors (e.g., a user's purchase history, a user's reputation score, etc.) to determine an overall verification status of the shopping cart 100. A high user reputation score, for example, can indicate a high level of virtual cart accuracy for the user for previous shopping trips (e.g., a virtual cart being shown to accurately represent the contents of a physical cart during checkout), whereas low reputation scores can indicate a low level of virtual cart accuracy for the user for previous shopping trips (e.g., a virtual cart being shown to not accurately represent the contents of a physical cart during checkout). The overall verification status of the shopping cart, for example, can be used as a factor in directing the user to an appropriate station during a checkout process.

During stage (C), a shopping cart may potentially be authorized for automated checkout. For example, the system 900 can perform operation 936, in which a determination of whether the user of the mobile device 112 (shown here as device 112C) and the shopping cart 100 (shown here as cart 100C) is authorized to proceed to an automated checkout station 970, or is to proceed to a manual checkout station 972. The automated checkout station 970, for example, can include RFID scanners, weight sensors, and/or high resolution cameras that can be used to determine whether the contents of the shopping cart 100, as tallied by the mobile device 112, correspond to what is being detected by the station 970. For example, the station 970 can measure the weight of the cart 100 and its contents, and determine whether the measured weight is within a threshold of the expected weight of the cart 100 and its contents, according to the mobile device tally. As another example, the station can use its RFID scanners to verify items with RFID tags that automated device sensors (e.g., IR scanners) are unable to verify with confidence. As another example, the station can use its cameras to capture one or more images of the cart 100 and its contents. If the cart 100 is validated across one or more of these signals, the customer may be automatically charged for the tallied contents and permitted to simply depart the retail environment 908. The manual checkout station 972, for example, can be a Point of Sale (POS) terminal at which items are removed from the shopping cart 100, an employee of the retail environment 908 individually scans the items to tally a total price, and the user provides a payment before departing the environment 908.

In general, determining whether a shopping cart is authorized for automated checkout can include determining a cart accuracy score for a virtual shopping cart, from verification results associated with items that have been placed in the shopping cart. Determining the cart accuracy score used for cart authorization, for example, can be based on a quantity of items in the cart (e.g., an absolute quantity, a percentage quantity, etc.) that have been verified, and/or an aggregated confidence score (e.g., averaged and/or weighted) for items in the cart, as described in further examples below. In some implementations, one or more additional authorization factors (e.g., a user's purchase history, a user's reputation score, etc.) can be considered when determining whether a shopping cart is authorized for automated checkout. For example, if a user is a regular customer of a store, and/or is a user of one or more additional services provided by the store (e.g., credit services, loyalty services, etc.), and/or has a high reputation score, a lower cart accuracy score may qualify the user for an automated checkout—whereas if the user is not a regular customer, and/or is not a user of additional services, and/or has a low reputation score, a higher cart accuracy may qualify the user for the automated checkout. In the present example, the shopping cart 100 is authorized for automated checkout (e.g., the virtual cart's accuracy score meets a threshold value), and the user is notified through output generated by the mobile device 112, which can be presented to the user at interface 962. At stage ($D_1$), for example, the user can proceed with the mobile device 112 and the shopping cart 100 to the automated checkout station 970 to perform an automated checkout operation 938. However, if the shopping cart 100 were not to be authorized for automated checkout (e.g., the virtual cart's accuracy score does not meet a threshold value), the user would be notified through output generated by the mobile device 112, and at stage ($D_2$), for example, the user could proceed with the mobile device 112 and the shopping cart 100 to the manual checkout station 972 to perform a manual checkout operation 940.

In some implementations, an additional item check may be performed after an automated checkout operation. For example, after the automated checkout operation 938 is performed on the shopping cart 100 (at stage ($D_1$)), the user can be presented with further instructions (e.g., through output presented by the mobile device 112, through an indicator on the shopping cart 100, and/or through output presented by the automated checkout station 970) for completing the shopping trip. If the automated checkout station 970 confirms that the user's virtual shopping cart accurately represents the contents of the physical shopping cart 100, for example, the user's transaction can be finalized and the user can be permitted to depart the retail environment 908. If the automated checkout station 970 is unable to confirm that the user's virtual shopping cart accurately represents the contents of the physical shopping cart 100 within a threshold level of certainty, for example, an employee of the retail environment 908 can be directed to perform an additional item verification (e.g., by scanning one or more random items, high value items, and/or specifically unverified items in the shopping cart 100). If the shopping cart 100 passes the additional item verification, for example, the user's transaction can be finalized and the user can be permitted to depart the retail environment 908. If, however, the shopping cart 100 does not pass the additional item verification, for example, the user can be directed to the manual checkout station 972 to perform the manual checkout operation 940. Similarly, if the automated checkout station 970 determines that the user's virtual shopping cart does not accurately represent the contents of the physical shopping cart 100 (e.g., one or more items were detected by the automated checkout station 970 as being in the shopping cart 100 that are not in the user's virtual shopping cart), the user can be directed to the manual checkout station 972 to perform the manual checkout operation 940.

In some implementations, upon completion of a shopping trip, a user's transaction may be automatically finalized and the user may be permitted to depart without first proceeding to an automated checkout station or a manual checkout station. For example, if a virtual cart's accuracy score meets a threshold value and one or more additional authorization factors pertain to the user (e.g., the user's reputation score meets a threshold value and/or the user subscribes to a loyalty program and/or uses credit services of the store), the user can be provided with a notification (e.g., on the mobile device 112 and/or the shopping cart 100) to confirm the transaction. After the user's transaction for the shopping trip is finalized, for example, the user can be permitted to simply depart the store. The example system 900 is further described in Application No. 63/276,460, entitled VERIFICATION OF ITEMS PLACED IN PHYSICAL SHOPPING CART, which is herein incorporated by reference. Moreover, example techniques for determining whether a shopping cart is authorized for automated checkout and verifying items by an automated checkout system are described in U.S. Application No. 63/276,471, entitled VERIFICATION OF ITEMS BY AUTOMATED CHECKOUT SYSTEM, which is herein incorporated by reference.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for validating products that are added to a shopping cart, the system comprising:
  a shopping cart configured to retain one or more products and be pushed by a user in a retail environment, wherein the shopping cart includes product validation hardware and a controller, the product validation hardware including a plurality of alternating light emitters and light sensors positioned in a straight line along a top perimeter of the shopping cart that corresponds to a top horizontal plane of the shopping cart, wherein the shopping cart is configured to:
    activate each of the light emitters in a successive order to emit light across the top horizontal plane of the shopping cart;
    receive, from one or more of the light sensors that are positioned on a side of the shopping cart that is opposite a side of the shopping cart where the activated light emitter is located, light intensity data that is collected by the one or more light sensors as a product passes through the top horizontal plane of the shopping cart and obstructs at least a portion of the emitted light from being detected by the one or more light sensors;
    identify, from the received light intensity data, one or more slices of the product; and
    reconstruct the product in three-dimensional (3D) space based on stitching together the identified slices of the product, wherein the reconstructed product is used to validate the product that is added to the shopping cart.

2. The system of claim 1, wherein the product validation hardware further includes one or more optical flow sensors positioned along the top perimeter of the shopping cart, and the shopping cart is further configured to:
  receive, from one or more of the optical flow sensors, position translation data of the product as the product passes through the top horizontal plane of the shopping cart;
  determine, based on the position translation data, a velocity of the product; and
  identify, based on the velocity of the product, the one or more slices of the product.

3. The system of claim 1, further comprising a mobile device in communication with at least one of the product validation hardware and the controller of the shopping cart, wherein the mobile device is configured to:
  receive user input indicating a scan of the product to be added to the shopping cart;
  identify a unique identifier for the product based on the scan; and
  retrieve, from a data store and based on the unique identifier, product information for the scanned product.

4. The system of claim 3, wherein the mobile device is further configured to:
  receive the reconstructed product from the shopping cart;
  compare the reconstructed product to product information of the scanned product to determine whether the reconstructed product is within a predetermined threshold range of the product information; and
  generate, based on determining that the reconstructed product is within the predetermined threshold range of the product information, output indicating that the product added to the shopping cart is validated.

5. The system of claim 1, wherein the shopping cart is further configured to receive, from one or more of the light sensors, an indication that the product is entering the top horizontal plane of the shopping cart, wherein the indication is a detection, by one or more of the light sensors, of a light beam being broken at the top horizontal plane of the shopping cart.

6. The system of claim 1, wherein the light emitters are infrared (IR) emitters and the light sensors are IR sensors.

7. The system of claim 1, wherein the light emitters are activated one at a time in a clockwise direction around a perimeter of the shopping cart.

8. The system of claim 1, wherein the slices of the product are occlusion slices representing low intensity light signals in the light intensity data of the product as the product changes in position over time.

9. The system of claim 1, wherein reconstructing the product in three-dimensional (3D) space comprises:
normalizing an orientation of the reconstructed product in a standard coordinate plane;
constraining the reconstructed product to a shape in a predefined set of primitive shapes to filter out noise, wherein the predefined set of primitive shapes includes at least one of rectangles, boxes, cylinders, and spheres; and
detecting body parts of a user in the reconstructed product and semantically separating the detected body parts from the reconstructed product.

10. A system for validating products that are added to a shopping cart, the system comprising:
a shopping cart configured to retain one or more products and be pushed by a user in a retail environment, wherein the shopping cart includes product validation hardware and a controller, the product validation hardware including a plurality of alternating light emitters and light sensors positioned in a straight line along a top perimeter of the shopping cart that corresponds to a top horizontal plane of the shopping cart and one or more optical flow sensors positioned along the top perimeter of the shopping cart; and
a mobile device in communication with at least one of the product validation hardware and the controller of the shopping cart, wherein the mobile device is configured to:
receive user input indicating a scan of a product to be added to the shopping cart;
identify a unique identifier for the product based on the scan;
retrieve, from a data store and based on the unique identifier, product information for the scanned product; and
transmit, to the controller, the product information,
wherein the controller of the shopping cart is further configured to:
receive, from the mobile device, the product information;
receive, from one or more of the light sensors, an indication that the product is entering a top horizontal plane of the shopping cart;
activate, based on the indication, each of the light emitters in a successive order and at predetermined time intervals to emit light across the top horizontal plane of the shopping cart;
receive, from one or more of the light sensors that are positioned on a side of the shopping cart that is opposite a side of the shopping cart where the activated light emitter is located, light intensity data that is collected by the one or more light sensors as the product passes through the top horizontal plane of the shopping cart and obstructs at least a portion of the emitted light from being detected by the one or more light sensors;
receive, from one or more of the optical flow sensors, position translation data of the product as the product passes through the top horizontal plane of the shopping cart;
determine, based on the position translation data, a velocity of the product;
identify, from the received light intensity data and based on the velocity of the product, one or more slices of the product;
reconstruct the product in three-dimensional (3D) space based on stitching together the identified slices of the product;
compare the reconstructed product to the product information of the scanned product to determine whether the reconstructed product is within a predetermined threshold range of the product information; and
generate, based on determining that the reconstructed product is within the predetermined threshold range of the product information, output indicating that the product added to the shopping cart is validated.

11. The system of claim 10, wherein the controller is further configured to poll the one or more optical flow sensors for the position translation data at predetermined time intervals that are coordinated with the predetermined time intervals for activating each of the light emitters.

12. The system of claim 10, wherein the position translation data includes movement direction and rate of movement of the product as it passes through the top horizontal plane of the shopping cart.

13. The system of claim 10, wherein the controller is configured to determine that the reconstructed product is within a predetermined threshold range of the product information comprises based on a geometry of the reconstructed product being within a predetermined threshold range of expected shape and volume data in the product information.

14. The system of claim 10, wherein the controller is further configured to determine that a classification of the product is correct based on the reconstructed product being within the predetermined threshold range of the product information.

15. The system of claim 10, wherein the controller is further configured to determine a quantity of the product based on comparing the reconstructed product to expected shape and volume data in the product information.

16. The system of claim 10, wherein reconstructing the product in three-dimensional (3D) space includes:
normalizing an orientation of the reconstructed product in a standard coordinate plane; and
constraining the reconstructed product to a shape in a predefined set of primitive shapes to filter out noise, wherein the predefined set of primitive shapes includes at least one of rectangles, boxes, cylinders, and spheres.

17. The system of claim 10, wherein reconstructing the product in three-dimensional (3D) space further includes detecting body parts of a user in the reconstructed product and semantically separating the detected body parts from the reconstructed product.

18. The system of claim 10, wherein reconstructing the product in three-dimensional (3D) space includes applying a machine learning model to the slices of the product to generate the reconstructed product, wherein the machine learning model was trained using a training dataset of (i) slices of other products and (ii) 3D reconstructions of the other products, wherein (i)-(ii) were provided to the machine learning model as input to train and validate the machine learning model.

19. The system of claim 10, wherein the controller is further configured to generate, based on determining that the reconstructed product is not within the predetermined threshold range of the product information, output indicating that the product added to the shopping cart is not validated,
- wherein the output includes a notification to be presented to the user at the mobile device, and
- wherein the notification prompts the user to (i) rescan the product that was added to the shopping cart or (ii) put a correct product that corresponds to the scanned product in the shopping cart.

20. The system of claim 10, wherein the controller is configured to generate, based on determining that the reconstructed product is not within the predetermined threshold range of the product information, instructions that, when executed at the mobile device, prevent the user from continuing to scan products with the mobile device until the product that was added to the shopping cart is validated.

\* \* \* \* \*